US012559291B2

(12) United States Patent
Waldron et al.

(10) Patent No.: US 12,559,291 B2
(45) Date of Patent: Feb. 24, 2026

(54) MULTI-FILM THERMOPLASTIC BAGS HAVING VISUALLY-DISTINCT CONTACT AREAS CREATING TEXT

(71) Applicant: THE GLAD PRODUCTS COMPANY, Oakland, CA (US)

(72) Inventors: Matthew W Waldron, West Chester, OH (US); Sarah J Steenblock, Cincinnati, OH (US); Shaun T Broering, Cincinnati, OH (US); Deborah K Fix, Maineville, OH (US); Edward B Tucker, Willowbrook, IL (US); Jeffrey S Stiglic, Willowbrook, IL (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 146 days.

(21) Appl. No.: 18/484,985

(22) Filed: Oct. 11, 2023

(65) Prior Publication Data

US 2024/0043190 A1 Feb. 8, 2024

Related U.S. Application Data

(63) Continuation of application No. 17/585,211, filed on Jan. 26, 2022, now Pat. No. 11,814,225, which is a
(Continued)

(51) Int. Cl.
B65D 65/40 (2006.01)
B32B 7/05 (2019.01)
(Continued)

(52) U.S. Cl.
CPC ............... B65D 65/40 (2013.01); B32B 7/05 (2019.01); B32B 7/10 (2013.01); B32B 37/10 (2013.01);
(Continued)

(58) Field of Classification Search
CPC .. B65D 65/40; B32B 7/05; B32B 7/10; B32B 37/10; B32B 38/06; B32B 2250/02; B32B 2250/24
See application file for complete search history.

(56) References Cited

U.S. PATENT DOCUMENTS 3,029,853 A 4/1962 Piazze
3,114,497 A 12/1963 Kugler
(Continued)

FOREIGN PATENT DOCUMENTS

CN 103648750 A 3/2014
CN 204222116 U 3/2015
(Continued)

OTHER PUBLICATIONS

U.S. Appl. No. 17/441,118, filed Apr. 18, 2024, Notice of Allowance.
(Continued)

*Primary Examiner* — Derek J Battisti
(74) *Attorney, Agent, or Firm* — Keller Preece PLLC

(57) ABSTRACT

One or more implementations of a multi-film thermoplastic structure include a first film having a first appearance in contact with a second film having a second appearance at one or more visually-distinct contact areas arranged into a text. Wherein the one or more visually-distinct contact areas, cause the first film to take on the second appearance of the second film. In one or more implementations the multi-film thermoplastic structure comprises a thermoplastic bag and text comprises a suffocation warning.

20 Claims, 13 Drawing Sheets

Related U.S. Application Data continuation-in-part of application No. 17/167,390, filed on Feb. 4, 2021, now Pat. No. 11,970,310, which is a continuation-in-part of application No. PCT/US2020/024143, filed on Mar. 23, 2020.

(60) Provisional application No. 62/825,520, filed on Mar. 28, 2019.

(51) Int. Cl.

| | | |
|---|---|---|
| *B32B 7/10* | (2006.01) | |
| *B32B 37/10* | (2006.01) | |
| *B32B 38/06* | (2006.01) | |
| *B65D 27/00* | (2006.01) | |
| *B65D 33/28* | (2006.01) | |

(52) U.S. Cl.
CPC ............. *B32B 38/06* (2013.01); *B65D 27/00* (2013.01); *B32B 2250/02* (2013.01); *B32B 2250/24* (2013.01); *B32B 2307/4026* (2013.01); *B32B 2439/46* (2013.01); *B65D 33/28* (2013.01); *B65D 2203/00* (2013.01)

(56) References Cited

U.S. PATENT DOCUMENTS

| | | | |
|---|---|---|---|
| 3,512,456 A | 5/1970 | Meyer | |
| 3,543,999 A | 12/1970 | Kugler | |
| 3,738,568 A | 6/1973 | Ruda | |
| 3,772,968 A | 11/1973 | Ruda | |
| 4,493,683 A | 1/1985 | Jostler | |
| 4,558,463 A | 12/1985 | Boyd | |
| 4,878,764 A | 11/1989 | Meyer | |
| 4,883,675 A | 11/1989 | Wemz | |
| 5,554,093 A | 9/1996 | Porchia et al. | |
| 5,716,137 A | 2/1998 | Meyer | |
| 5,928,972 A | 7/1999 | Mashiko et al. | |
| 6,561,696 B1 | 5/2003 | Rusnak et al. | |
| 7,938,635 B2 | 5/2011 | Heilman et al. | |
| 8,876,382 B2 | 11/2014 | Wilcoxen et al. | |
| 9,393,757 B2 | 7/2016 | Borchardt et al. | |
| 9,604,429 B2 | 3/2017 | Borchardt et al. | |
| 9,745,126 B1 | 8/2017 | Cobler | |
| 10,549,467 B2 | 2/2020 | Borchardt et al. | |
| 10,934,058 B2 | 3/2021 | Cobler | |
| 11,345,118 B2 | 5/2022 | Wilcoxen et al. | |
| 2004/0137200 A1 | 7/2004 | Chhabra et al. | |
| 2005/0123219 A1 | 6/2005 | Schneider | |
| 2007/0036472 A1 | 2/2007 | Persenda | |
| 2007/0257402 A1* | 11/2007 | Rasmussen | B32B 27/08 428/59 |
| 2009/0094943 A1 | 4/2009 | Heilman et al. | |
| 2010/0111452 A1 | 5/2010 | Ross | |
| 2010/0266222 A1* | 10/2010 | Rusnak | B31B 70/8132 493/243 |
| 2011/0052105 A1 | 3/2011 | Wilcoxen et al. | |
| 2012/0045153 A1 | 2/2012 | Schmal et al. | |
| 2012/0134606 A1* | 5/2012 | Borchardt | B65D 33/28 156/196 |
| 2012/0269465 A1* | 10/2012 | Dorsey | B65D 33/01 428/167 |
| 2015/0071574 A1* | 3/2015 | Fraser | B29C 66/8511 383/109 |
| 2015/0104121 A1 | 4/2015 | Broering et al. | |
| 2015/0191599 A1* | 7/2015 | Cobler | B65D 81/03 428/167 |
| 2017/0305104 A1* | 10/2017 | Wilcoxen | B32B 3/30 |
| 2018/0282025 A1 | 10/2018 | Odenthal | |
| 2022/0144516 A1 | 5/2022 | Waldron et al. | |
| 2022/0219864 A1 | 7/2022 | Steenblock et al. | |

FOREIGN PATENT DOCUMENTS

| | | | |
|---|---|---|---|
| CN | 104918767 A | 9/2015 | |
| CN | 207312156 U | 5/2018 | |
| DE | 8634032 U1 | 3/1987 | |
| DE | 4133095 | 10/1992 | |
| DE | 202008013591 U1 | 2/2010 | |
| DE | 102016116639 A1 | 3/2017 | |
| EP | 266670 B1 | 3/1992 | |
| EP | 953511 B1 | 3/2003 | |
| EP | 1364892 B1 | 12/2005 | |
| ES | 1061986 U | 5/2006 | |
| FR | 2858807 A1 | 10/2005 | |
| GB | 2009098 B | 2/1982 | |
| JP | 2002179089 A | 6/2002 | |
| JP | 4140337 B2 | 6/2008 | |
| WO | WO 88/04635 | 6/1988 | |
| WO | WO 2001/51372 A1 | 7/2001 | |
| WO | WO 2005/016791 A1 | 2/2005 | |
| WO | WO 2006/097104 A2 | 9/2006 | |
| WO | 2016/040765 A1 | 3/2016 | |
| WO | WO-2016073722 A1 * | 5/2016 | ............. D04H 3/147 |

OTHER PUBLICATIONS

U.S. Appl. No. 18/330,138, filed Jun. 20, 2024, Office Action.
U.S. Appl. No. 17/167,390, filed Dec. 20, 2023, Notice of Allowance.
U.S. Appl. No. 17/441,118, filed Jan. 12, 2024, Office Action.
Examination Report as received in Australian Application No. 2020245443 dated Apr. 2, 2025.
Examination Report as received in Canadian Application No. 3134701 dated Jan. 29, 2025.
U.S. Appl. No. 17/167,390, filed Jul. 26, 2022, Office Action.
U.S. Appl. No. 17/167,390, filed Jan. 13, 2023, Office Action.
U.S. Appl. No. 17/167,390, filed May 3, 2023, Office Action.
U.S. Appl. No. 17/585,211, filed May 19, 2023, Office Action.
U.S. Appl. No. 17/585,211, filed Jul. 28, 2023, Notice of Allowance.
PCT Application No. PCT/US2020/024143 International Search Report dated Jul. 15, 2020.
PCT Application No. PCT/US2020/024143 Written Opinion of the International Searching Authority dated Jul. 15, 2020.
Office Action as received in CN application 202080025253.8 dated Oct. 12, 2023.
U.S. Appl. No. 17/167,390, filed Sep. 6, 2023, Office Action.
U.S. Appl. No. 17/585,211, filed Jul. 8, 2023, Notice of Allowance.
U.S. Appl. No. 18/330,138, filed Sep. 5, 2024, Notice of Allowance.
U.S. Appl. No. 18/425,798 filed Aug. 6, 2025, Notice of Allowance.
U.S. Appl. No. 18/635,891 filed Nov. 13, 2025, Office Action.

* cited by examiner

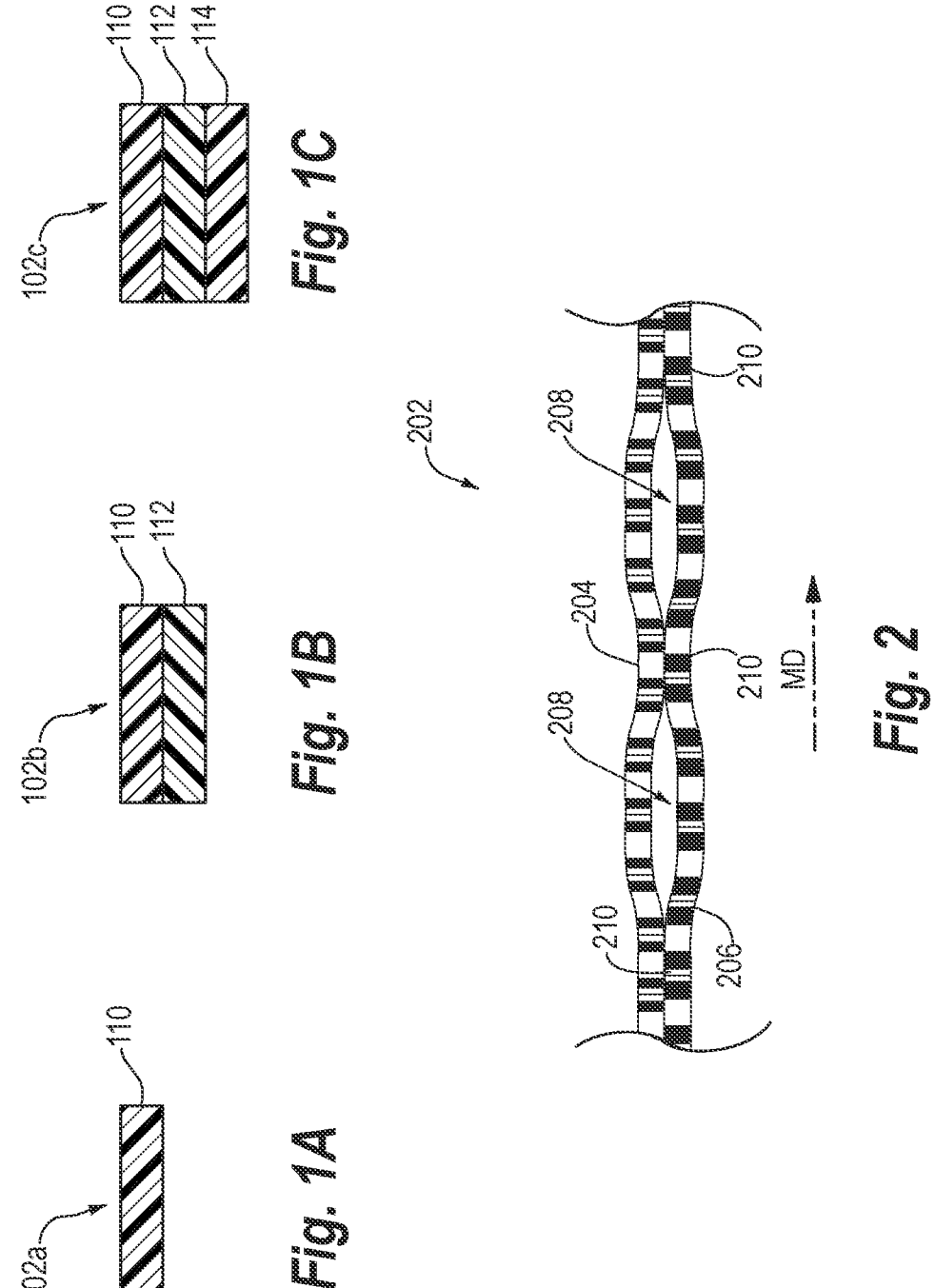
_Fig. 1A_
_Fig. 1B_
_Fig. 1C_
_Fig. 2_

600

DANGER OF SUFFOCATION - KEEP THIS PLASTIC BAG AWAY FROM BABIES AND CHILDREN

427

440

406

426a

426b

426c

410

408

900

905

902

906

908

920

910

901

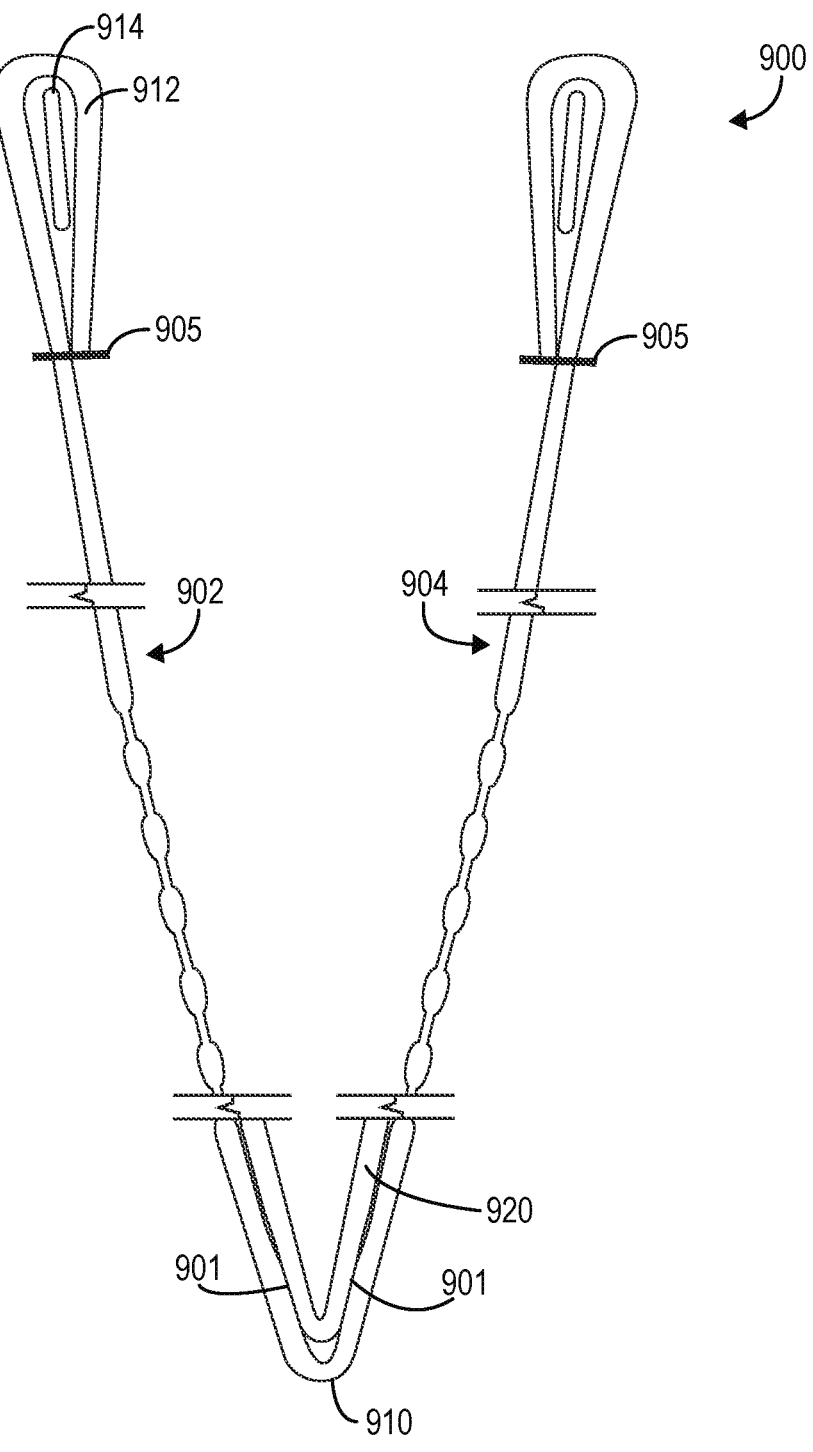
_Fig. 9B_

MULTI-FILM THERMOPLASTIC BAGS HAVING VISUALLY-DISTINCT CONTACT AREAS CREATING TEXT

CROSS-REFERENCE TO RELATED APPLICATIONS

The present application is a continuation of U.S. patent application Ser. No. 17/585,211, filed on Jan. 26, 2022 and entitled MULTI-FILM THERMOPLASTIC STRUC-TURES HAVING VISUALLY-DISTINCT CONTACT AREAS ARRANGED IN TEXT AND METHODS OF MAKING THE SAME, which is a continuation-in-part of U.S. patent application Ser. No. 17/167,390, filed on Feb. 4, 2021 and entitled MULTI-FILM THERMOPLASTIC BAGS HAVING GRAB ZONES WITH CONTACT AREAS AND METHODS OF MAKING THE SAME, which is a continuation-in-part of International Application No. PCT/US2020/024143, filed on Mar. 23, 2020 and entitled: MULTI-FILM THERMOPLASTIC STRUC-TURES AND BAGS HAVING VISUALLY-DISTINCT CONTACT AREAS AND METHODS OF MAKING THE SAME, which claims the benefit of and priority to U.S. Provisional Application No. 62/825,520, filed Mar. 28, 2019 and entitled: MULTI-FILM THERMOPLASTIC STRUC-TURES AND BAGS HAVING VISUALLY-DISTINCT CONTACT AREAS AND METHODS OF MAKING THE SAME. The contents of the above-referenced applications are hereby incorporated by reference in their entirety.

BACKGROUND

1. Technical Field

The present application relates generally to thermoplastic bags. More particularly, the present application relates to thermoplastic bags including multiple films and unique aesthetics.

2. Background and Relevant Art

Thermoplastic films are a common component in various commercial and consumer products. For example, grocery bags, trash bags, sacks, and packaging materials are prod-ucts that are commonly made from thermoplastic films. Additionally, feminine hygiene products, baby diapers, adult incontinence products, and many other products include thermoplastic films to one extent or another.

With regard to bags made from thermoplastic films, some jurisdictions require a suffocation warning on thermoplastic bags with openings greater than a predetermined size (e.g., 5 inches). Conventionally such suffocation warnings are printed on thermoplastic bags using ink. For example, a common technique is to print such warnings using a dot matrix type ink jet printer. Unfortunately, such printed warnings often lack density and contrast, thereby reducing legibility. Furthermore, ink printed on thermoplastic bags often lacks permanence. For example, the ink may wipe off or smear due to contact, particularly when the thermoplastic film contains additives that migrate to the film surface and interfere with ink adhesion. In an attempt to avoid some of the foregoing problems, manufacturers may treat the surface of thermoplastic films. Ink printing on treated thermoplastic films, however, often still lacks density, contrast, and per-manence.

Additionally, printing ink on thermoplastic bags causes a decrease in efficiency and an increase in the cost of bag production. Both ink-based printing equipment and surface treating equipment is expensive and adds processing time. Furthermore, such equipment requires frequent mainte-nance, which can temporarily halt bag production all together.

In addition to the foregoing, the cost to produce products including thermoplastic film is directly related to the cost of the thermoplastic film. Recently the cost of thermoplastic materials has risen. In response, some attempt to control manufacturing costs by decreasing the amount of thermo-plastic material in a product. One way manufacturers may attempt to reduce production costs is to stretch the thermo-plastic film, thereby increasing its surface area and reducing the amount of thermoplastic film needed to produce a product of a given size.

While stretched, thinner gauge materials can represent cost savings to the manufacturer, the use of thinner gauge films can result in lower durability. Although some recent technology may, in some cases at least, result in relatively thinner gauge films that may be as strong as their thicker counterparts, customers naturally sense from prior experi-ence that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. This is particularly true when thin looking or feeling films are used in areas of customer products with which the customer comes in direct contact—such as the open end of a trash bag where a customer would gather the bag in order to remove the bag from a trash can.

Thus, even though some mechanisms can improve some aspects of film strength while using a thinner gauge, the look and feel of such films tend to cause customers to believe the film is nevertheless low quality. For example, thinner ther-moplastic films are typically more transparent or translucent. Such consumers may feel that they are receiving less value for their money when purchasing products with thinner films; and thus, may be dissuaded to purchase thinner thermoplastic films.

BRIEF SUMMARY

One or more implementations of the present disclosure solve one or more problems in the art with multi-film thermoplastic structures including text formed by visually-distinct contact areas between adjacent films. The text comprises areas in which at least first and second thermo-plastic films of the multi-film thermoplastic structure are in intimate contact. Furthermore, when viewing the first ther-moplastic film, the visually-distinct contact areas formed into text differ in appearance (e.g., have a different color) than areas of the first thermoplastic film not in intimate contact with the second thermoplastic film. The difference in appearance between the text areas and the adjacent film provides contrast that results in enhanced legibility of the text as compared to ink-based text without the drawbacks of ink printing.

For example, an implementation of a multi-film thermo-plastic structure comprises a first thermoplastic film having a first appearance and a second thermoplastic film having a second appearance created by a pigment. The first appear-ance differs from the second appearance. The a multi-film thermoplastic structure also includes one or more separated portions where the first thermoplastic film and the second thermoplastic film are not in intimate contact. The multi-film thermoplastic structure further includes one or more contact areas arranged into text. The one or more contact areas arranged into text comprise portion of the multi-film thermoplastic structure where the first thermoplastic film and the second thermoplastic film are in intimate contact. The one or more contact areas arranged into text also comprise a contrast relative to separated portions surrounding the one or more contact areas, which when viewed in the first thermoplastic film make the text legible.

Additionally, an implementation of a thermoplastic bag includes first and second thermoplastic film sidewalls joined together along a first side edge, an opposite second side edge, and a closed bottom edge. The first and second thermoplastic film sidewalls comprise a first color. The thermoplastic bag additionally includes a layer of thermoplastic material adjacent to at least a portion of the first thermoplastic film sidewall. The layer of thermoplastic material comprises a second color. The thermoplastic bag further comprises one or more separated portions where the first thermoplastic film sidewall and layer of thermoplastic material are separated by a gap. The thermoplastic bag further includes one or more contact areas arranged into text. The one or more contact areas arranged into text comprise portions in which the first thermoplastic film sidewall and layer of thermoplastic material are bonded together. The one or more contact areas arranged into text also comprise the second color whereby the one or more contact areas arranged into text differ in appearance from separated portions surrounding the one or more contact areas making the text legible when viewed in the first thermoplastic film sidewall.

In addition to the foregoing, a method for making a thermoplastic bag involves positioning a first thermoplastic film having a first appearance over a second thermoplastic film having a second appearance. The second appearance of the second thermoplastic film differs from the first appearance of the first thermoplastic film. The method also involves passing the first thermoplastic film and the second thermoplastic film together through a set of contact rollers. The set of contact rollers comprise a plurality of punch regions arranged in a string of text. Additionally, passing the first thermoplastic film and the second thermoplastic film together through the set of contact rollers creates the string of text in the thermoplastic bag by bonding the first and second thermoplastic films together in a plurality of contact areas that are visually-distinct from areas in which first thermoplastic film and the second thermoplastic film are separated. The method also involves forming the first and second thermoplastic films into a bag.

Passing the first thermoplastic film and the second thermoplastic film between the set of contact rollers creates one or more visually-distinct contact areas between a flat portion of the first thermoplastic film to a flat portion of the second thermoplastic film. The one or more visually-distinct contact areas create one or more areas in the flat portion of the first thermoplastic film having the second appearance. The one or more visually-distinct contact areas being configured to separate before the flat portion of the first thermoplastic film or the flat portion of the second thermoplastic film fails when subjected to peel forces.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 1A-IC show partial side cross-sectional views of films having varying numbers of layers according to one or more implementations of the present disclosure;

FIG. 2 shows a partial side cross-sectional view of a multi-film thermoplastic structure having contact areas between first and second thermoplastic films according to one or more implementations of the present disclosure;

FIG. 9B illustrates a cross-sectional view of the thermoplastic bag of FIG. 9A according to one or more implementations of the present disclosure;

DETAILED DESCRIPTION

Figures 3A, 3B, 3C, 3D:
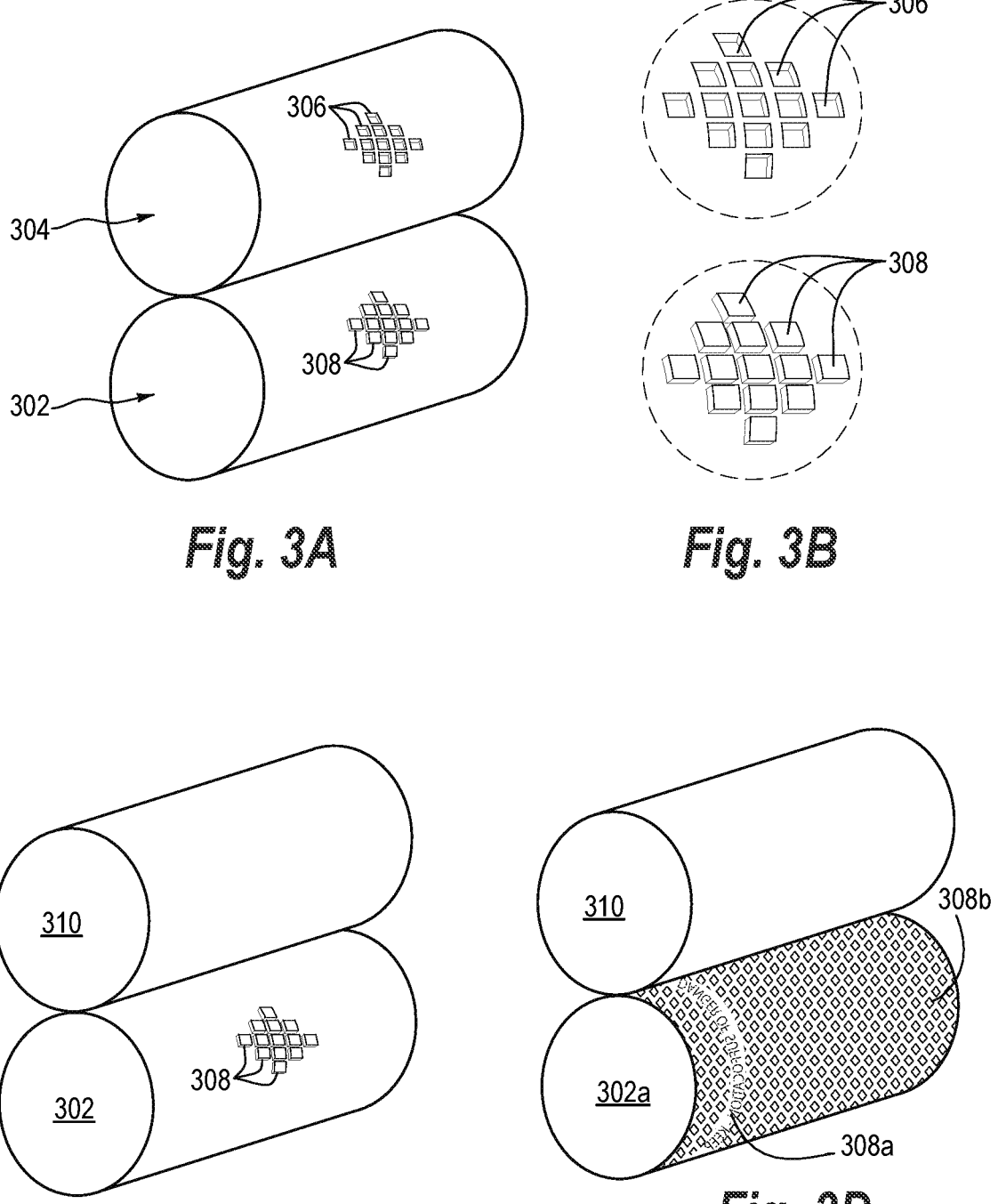
FIG. 3A shows a set of contact rollers for forming contact areas according to one or more implementations of the present disclosure.
FIG. 3B shows a close up view of the set of contact rollers of FIG. 3A according to one or more implementations of the present disclosure.
FIG. 3C shows a perspective view of another set of contact rollers for forming contact areas according to one or more implementations of the present disclosure.
FIG. 3D shows a perspective view of yet another set of contact rollers for forming contact areas arranged in text according to one or more implementations of the present disclosure.

One or more implementations of the present disclosure include apparatus and methods for creating multi-film thermoplastic film structures or bags with contact areas arranged in text. In particular, one or more implementations include a multi-film thermoplastic bag including regions of contact areas, where the contact areas create easily legible and visible text. The contact areas, thus, create visual and tactile cues of strength and quality in areas of the multi-film thermoplastic bags that are highly visible. In one or more implementations, the contact areas arranged to form text allows for thermoplastic film products to include text without the use of ink, which after lacks density, contrast, and permanence when printed on thermoplastic products.

In particular, one or more implementations include a multi-film thermoplastic bag having sidewalls comprising a first thermoplastic film and an adjacent second thermoplastic film. The contact areas comprise portions of the first thermoplastic film that are in intimate contact with portions of the second thermoplastic film and vice versa. In one or more implementations, the contact areas are arranged to form text, such as suffocation warnings, branding, or other messages. Along with providing a readable text, the contact areas provide the thermoplastic bag with a stronger and/or more rigid feel—thus, giving a tactile cue that the bag is less likely to rip, tear, or puncture when handled.

In one or more implementations, the contact areas of a multi-film thermoplastic bag can bring a surface of a first thermoplastic film and a second thermoplastic film into intimate contact. In one or more implementations, the first thermoplastic film is an outer thermoplastic bag of a multi-layered thermoplastic bag and the second thermoplastic film is an inner thermoplastic bag of the multi-layered thermoplastic bag. In alternative implementations, the first thermoplastic film is a sidewall of a single layer thermoplastic bag and the second thermoplastic film is an insert.

Bringing the first and second thermoplastic films into direct contact can cause an appearance change. In particular, in one or more implementations, when viewed from the first thermoplastic film side of the multi-film thermoplastic bag, the contact areas comprise a different color than the portions of the first thermoplastic film not in intimate contact with the second thermoplastic film (e.g., separated by an air gap or space).

Moreover, when films of a multi-film thermoplastic bag have different appearances, due to the inclusion of a pigment or other coloring agent, the contact areas cause the appearance of areas of visual contrast in adjacent films. For example, in a two-film thermoplastic bag where the first thermoplastic film is a light color and the second thermoplastic film is a dark color, intimate contact between the two films cause a wetting effect in an area of the first thermoplastic film. For instance, the intimate contact removes air from between portions of the two films such that the color of the second thermoplastic film shows through the first thermoplastic film. Thus, in this example the contact areas cause a dark area to appear in the lighter first thermoplastic film. Thus, the contact areas can create intimate contact between a portion of a first film and a portion of a second film causing the area of intimate contact to take on the visual characteristics of one of the films. Alternatively, the area of the intimate contact can take on a visual appearance that is a blending of the first and second films, or an appearance that is different from both the first and second films. In any event, the contact areas can have a size and arrangement to form text that contrasts in appearance from areas of the first thermoplastic film not in intimate contact with the second thermoplastic film.

One will appreciate in light of the disclosure here that portions of the films of a multi-film thermoplastic bag can be brought into intimate contact with each other using various techniques. In particular, one or more implementations involve utilizing heat and pressure on the films of the multi-film thermoplastic bag to bring the films together and create the contact areas. Furthermore, one or more implementations involve controlling the amount of heat and pressure to tailor the properties of the areas forming the contact areas. For example, in one or more implementations enough heat and pressure are applied so as to bring the films into intimate contact but not so much as to degrade the strength or otherwise weakening the films. For example, in one or more implementations a strength of the films in the contact areas is not substantially weakened. More particularly, in one or more implementations a transverse-direction tensile strength of the films with contact areas is not significantly lower than the areas of the films not including the contact areas. Still further, in one or more implementations, an impact strength (e.g., as measured by a dart drop test) of the films with contact areas is not significantly lower than the areas of the films not including the contact areas.

Additionally, one or more implementations involve controlling the amount of heat and pressure to tailor the properties of the films forming the contact areas such that the films are in intimate contact but unbonded or lightly bonded. For example, one or more implementations provide for forming contact areas between adjacent films of a multi-film thermoplastic bag that are relatively light such that forces acting on the multi-film bag are first absorbed by breaking the bond(s) of the contact areas rather than, or prior to, tearing or otherwise causing the failure of any of the films of the multi-film bag when subjected to peel forces within a given range. Such implementations can provide an overall thinner film employing a reduced amount of raw material that nonetheless has maintained or increased strength parameters. Alternatively, such implementations can use a given amount of raw material and provide a film with increased strength parameters. For example, films including contact areas can have an increased resistance to tear propagation. In particular, a tear propagating across the film can be stopped or otherwise prohibited when running into a contact area.

In particular, the contact areas between adjacent layers of multi-film bags in accordance with one or more implementations can act to first absorb forces via breaking prior to allowing those same forces to cause failure of the individual films of the multi-film bag when subjected to peel forces. Such action can provide increased strength to the multi-film thermoplastic bag. In one or more implementations, the contact areas include a bond strength that is less than a weakest tear resistance of each of the individual films so as to cause the bonds of the contact areas to fail prior to failure of the films when subjected to peel forces within a given range. Indeed, one or more implementations include contact areas that release between films of a multi-film thermoplastic bag prior to any localized tearing of the films of the multi-film thermoplastic bag.

Thus, in one or more implementations, the contact areas of a multi-film thermoplastic bag can fail before either of the individual layers undergoes molecular-level deformation. For example, an applied strain can pull the contact areas apart prior to any molecular-level deformation (stretching, tearing, puncturing, etc.) of the individual film layers. In other words, the contact areas can provide less resistive force to an applied strain than molecular-level deformation of individual films of the multi-film bag. Such a configuration of contact areas can provide increased strength properties to the multi-film thermoplastic bag as compared to a monolayer film of equal thickness or a multi-film bag in which the plurality of layers are tightly bonded together (e.g., coextruded). As such, contact areas arranged into text are able to convey a message as well as provide strength benefits.

In one or more alternative implementations, the contact areas of a multi-film thermoplastic bag are formed with heat and pressure so as to create a permanent bond between the first and second thermoplastic layers. In such implementations, the bond between the first and second thermoplastic layers created by the contact areas can be inseparable without causing failure of one or more of the first and second thermoplastic films. Contact areas with permanent bonds can ensure that text formed by the contact areas does not lose visibility during use of the thermoplastic bag or structure.

Various implementations of multi-layer thermoplastic structures, such as multi-layer thermoplastic bags, with contact areas arranged into text provide various advantages over conventional structures and techniques. For example, the contact areas can provide a contrast (as described above) that provides enhanced legibility of the text compared to ink-based text on thermoplastic films. In particular, contact areas arranged into text in accordance with one or more implementations are configured to have higher density and more solidly defined text compared to ink-based printing, particularly dot matrix type ink jet printers.

Furthermore, in one or more implementations, the contact areas arranged into text provide increased permanence compared to ink-based printing of text on thermoplastic films. In particular, text formed from contact areas in accordance with one or more implementations cannot be wiped off or smeared as often happens to ink-printed text on thermoplastic films.

Additionally, creating text via contact areas rather than ink can reduce capital costs due to removal of ink-based printing and/or surface treatment equipment. In addition to reducing capital costs, use of contact area based text instead of ink can reduce manufacturing costs. In particular, by eliminating ink material consumption and volatile organic compound management associated with printing ink-based text on thermoplastic films by creating text via contact areas reduces the cost to create thermoplastic bags with text. Along related lines, such thermoplastic bags with text can be created more efficiently by creating the text using contact areas instead of ink as no refilling of ink wells or management of ink-based equipment is necessary.

As used herein, the terms "lamination," "laminate," and "laminated film," refer to the process and resulting product made by bonding together two or more layers of film or other material. The term "bonding," when used in reference to bonding of multiple layers of a multi-film bag, may be used interchangeably with "lamination" of the layers. According to one or more implementations, adjacent films of a multi-film bag are laminated or bonded to one another.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, heat bonding, and the like) two or more separately made film articles to one another so as to form a multi-film bag. As a noun, "laminate" means a product produced by the affixing or adhering just described.

In one or more implementations, the contact areas between films of a multi-film bag may be continuous. As used herein, a "continuous" area of contact areas refers to one or more contact areas that are continuously positioned in an area, and arranged in the machine direction, in the transverse direction, or in an angled direction.

In one or more implementations, the contact areas between films of a multi-film bag may be in a discrete or non-continuous pattern (i.e., discontinuous or partially discontinuous). As used herein, a "discrete pattern" of contact areas refers to a non-repeating pattern of pattern elements in the machine direction, in the transverse direction, or in an angled direction.

In one or more implementations, the contact areas between films of a multi-film bag may be in a partially discontinuous pattern. As used herein, a "partially discontinuous" pattern of contact areas refers to pattern elements that are substantially continuous in the machine direction or in the transverse direction, but not continuous in the other of the machine direction or the transverse direction. Alternately, a partially discontinuous pattern of contact areas refers to pattern elements that are substantially continuous in the width of the article but not continuous in the height of the article, or substantially continuous in the height of the article but not continuous in the width of the article. Alternatively, a partially discontinuous pattern of contact areas refers to pattern elements that are substantially continuous for a width and height that is less than the width and height of the article. More particularly, a partially discontinuous pattern of contact areas refers to repeating pattern elements broken up by repeating separated areas in either the machine direction, the transverse direction, or both. Both partially discontinuous and discontinuous patterns are types of non-continuous heated pressure bonding (i.e., bonding that is not complete and continuous between two surfaces).

One or more implementations involve bringing pigmented, lightly pigmented, and/or substantially un-pigmented thermoplastic films into intimate contact. As used herein, the term "substantially un-pigmented" refers to a thermoplastic ply or plies that are substantially free of a significant amount of pigment such that the ply is substantially transparent or translucent. For example, a "substantially un-pigmented" film can have a pigment concentration (i.e., percent of total composition of the film) that is between 0% by weight and 2% by weight. In some embodiments, a "substantially un-pigmented" film can have a pigment concentration between about 0% by weight and about 1% by weight. In further embodiments, a "substantially un-pigmented" film can have a pigment concentration between about 0% by weight and about 0.75% by weight. A substantially un-pigmented film can have a transparent or translucent appearance.

As used herein, the term "lightly pigmented" refers to a thermoplastic ply or plies that are pigmented such that, when placed into intimate contact with a pigmented film, an unexpected appearance is produced. For example, the unexpected appearance can be a "wetting" of a color of the pigmented film through the lightly pigmented film. Alternately, the unexpected appearance may be an effect that differs from an appearance (e.g., colors) of the individual films. If a film has too much pigment, when placed into intimate contact with another pigmented film, an unexpected appearance will not be produced. The amount of pigment in a lightly pigmented film that will produce the unexpected appearance can be dictated by the thickness of the film.

A pigmented film, in one or more implementations, can comprise a lightly pigmented film or a film with a greater percentage of pigment than a lightly pigmented film. As mentioned above, in one or more embodiments, a first thermoplastic film is substantially un-pigmented or lightly pigmented and a second thermoplastic film is pigmented. Thus, in one or more embodiments, the second thermoplastic layer has a greater percentage of pigment than the first thermoplastic layer. Alternatively, the first and second thermoplastic layers have the same percentage of pigment but the first thermoplastic layer comprises a lighter pigment than a pigment of the second thermoplastic layer. In still further implementations, the substantially un-pigmented or lightly pigmented thermoplastic film comprises a greater percent weight of pigment than the pigmented thermoplastic film. Nonetheless, in such implementations, the un-pigmented or lightly pigmented thermoplastic film can be more transparent or translucent film than the pigmented thermoplastic film.

As used herein, the term "pigment or pigments" are solids of an organic and inorganic nature which are defined as such when they are used within a system and incorporated into the thermoplastic film, absorbing part of the light and reflecting the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes (BaSO4), and Calcium Carbonate (CaCO3).

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; p=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and bags that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-film bag may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As described above, a multi-film thermoplastic bag includes a plurality of thermoplastic films. Each individual film may itself include a single layer or multiple layers. In other words, the individual films of the multi-film bag may each themselves comprise a plurality of layers. Such layers may be significantly more tightly bonded together than the bonding (if any) of the contact areas. Both tight and relatively weak bonding can be accomplished by joining layers by mechanical pressure, joining layers with heat, joining with heat and pressure, joining layers with adhesives, spread coating, extrusion coating, ultrasonic bonding, static bonding, cohesive bonding and combinations thereof. Adjacent sub-layers of an individual film may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

A thermoplastic film can may include a one, two, three, or more layers of thermoplastic material. FIGS. 1A-IC are partial cross-sectional views of films that can be included in a multi-film thermoplastic bag of one or more implementations. In some implementations, the film may include a single layer film 102a, as shown in FIG. 1A, comprising a single first layer 110. In other embodiments, the film can comprise a two-layer film 102b as shown in FIG. 1B, including the first layer 110 and a second layer 112. The first and second layers 110, 112 can be coextruded. In such implementations, the first and second layers 110, 112 may optionally include different grades of thermoplastic material and/or include different additives, including polymer additives and/or pigments. In yet other implementations, a film be a tri-layer film 102c, as shown in FIG. 1C, including the first layer 110, the second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

In one example, the film 102a can comprise a 0.5 mil, 0.920 density LLDPE, colored film containing 4.8% pigment that appears a first color. In an alternative embodiment, the film 102a can comprise a 0.5 mil, 0.920 density LLDPE, un-pigmented film that appears clear or substantially clear. In still further embodiments, the film 102a can comprise a 0.5 mil, 0.920 density LLDPE, pigmented film that appears a second color.

In at least one implementation, such as shown in FIG. 1C, a multilayered film 102c can include co-extruded layers. For example, the film 102c can include a three-layer B:A:B structure, where the ratio of layers can be 20:60:20. The exterior B layers (i.e., the first layer 110, and the third layer 114) can comprise a mixture of hexene LLDPE of density 0.918, and metallocene LLDPE of density 0.920. The interior A core layer (i.e., the second layer 112) can comprise a mixture of hexene LLDPE of density 0.918, butene LLDPE of density 0.918, reclaimed resin from trash bags. Additionally, the A core layer (i.e., the second layer 112) can include a pigment. For example, the A core layer can include a colorant in an amount between about 0.1 percent and about 6%.

In another example, the film 102c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 102c.

In another example, the film 102c is a coextruded three-layer C:A:B structure where the ratio of layers is 20:60:20. The C layer (i.e., the third layer 114) can comprise a LLDPE material with a first colorant (e.g., black). The B layer (i.e., the second layer 112) can also comprise a LLDPE material with a second colorant (e.g., white). The LLDPE material can have a MI of 1.0 and density of 0.920 g/cm3. The A core layer (i.e., the first layer 110) can comprise similar materials to any of the core layer describe above. The A core layer can comprise a black colorant, a white colorant, or can be clear.

In still further embodiments, a film can comprise any number of co-extruded layers. More particularly in one or more embodiments, a film can comprise any number of co-extruded layers so long as the A and B layers do not alternate such that the A layers are on one side and the B layers are on the other side. In still further embodiments, a film can comprise one or more co-extruded layers between the A and B layers. For example, the film can comprise clear or transparent layers between the A and B layer(s). In still further embodiments, a film can comprise intermittent layers of different colors in addition to the A and B layer(s).

FIG. 2 illustrates one example of a multi-film thermoplastic structure 202 including contact areas 210 between a first thermoplastic film 204 and a second thermoplastic film 206. Each of the thermoplastic films 204, 206 can comprise any of the thermoplastic films 102a-102c described above or a film with more than three layers. FIG. 2 illustrates that the first thermoplastic film 204 of the multi-film thermoplastic structure 202 abutted directly against the second thermoplastic film 206 at contact areas 210. In particular, the multi-film thermoplastic structure 202 can include contact areas 210 and separated areas 208. The contact areas 210 remove the air and/or space between the thermoplastic films 204, 206.

As shown by FIG. 2, the contact areas 210 can comprise areas in which the first thermoplastic film 204 is in direct, or intimate, contact with the second thermoplastic film 206. As such, the contact areas 210 can create regions that are visually distinct from the rest of the multi-film thermoplastic structure 202 (at least when viewing the major surface of the first thermoplastic film 204). In other words, because the first thermoplastic film 204 is directly abutted against the second thermoplastic film 206, the contact areas 210 can have the color or appearance of the second thermoplastic film 206 or another color or appearance that differs from the separated portions of the first thermoplastic film 204.

For example, in one or more implementations, the second thermoplastic film 206 can comprise a pigmented film and have a black appearance while the first thermoplastic film 204 is substantially un-pigmented or lightly pigmented and have a clear, transparent, or cloudy appearance. When combined to form a multi-film thermoplastic structure 202 in accordance the principles described herein, the first thermoplastic film 204 as part of the multi-film thermoplastic structure 202 can have a color or appearance that differs from the color of the first thermoplastic film 204. For example, the first thermoplastic film 204 can have a metallic, silvery metallic or light grey color rather than a black appearance or color as would be expected (i.e., due to viewing the second thermoplastic film 206 through a clear or transparent film). The regions or areas of the two films in intimate contact with each other create contact areas that have a color or appearance that differs from the color or appearance of the first thermoplastic film 204. For example, the contact areas 210 can have the color or appearance of the second thermoplastic film 206 (e.g., black).

In one or more alternative implementations, the first thermoplastic film 204 comprises a light colorant while the second thermoplastic film 206 comprises a dark colorant. As used herein, a light colorant is a color with a brightness closer to the brightness of white than the brightness of black. As used herein, a dark colorant is a color with a brightness closer to the brightness of black than the brightness of white. In one or more embodiments, the first thermoplastic film 204 has a concentration of light colorant between about 1% by mass and about 15% by mass. More particularly, in one or more embodiments, the first thermoplastic film 204 has a concentration of light colorant between about 2% by mass and about 12% by mass. In still further embodiments, the first thermoplastic film 204 has a concentration of light colorant between about 5% by mass and about 10% by mass.

Still further, the second thermoplastic film 206 has a concentration of dark colorant between about 1% by mass and about 15% by mass. More particularly, in one or more embodiments, the second thermoplastic film 206 has a concentration of dark colorant between about 2% by mass and about 12% by mass. In still further embodiments, the second thermoplastic film 206 has a concentration of dark colorant between about 5% by mass and about 10% by mass.

The white colored first thermoplastic film 204, when part of the multi-film thermoplastic structure 202 can have a gray appearance. The foregoing described color change may give the appearance of a third color without requiring the actual colorant mixture of the third color to be within the multi-film thermoplastic structure 202. In other words, the bag can be devoid of a gray pigment. For example, it may allow a film having a viewable black layer and a viewable white layer to have (i.e., mimic) a gray appearance (often a consumer preferred color). Furthermore, the foregoing described color change may allow the film to mimic a gray appearance without significantly increasing and/or reducing a transparency (i.e., light transmittance) of the film. In other words, the foregoing described color change may allow the multi-film thermoplastic structure 202 to mimic a gray appearance without detrimentally affecting an appearance of quality of the film.

Thus, the contact areas have a color or appearance that differs from the color or appearance of the first thermoplastic film 204. For example, the contact areas 210 can have the color or appearance of the second thermoplastic film 206 (e.g., black) or another color. One will appreciate in light of the disclosure herein that black and white are used as exemplary colors for ease in explanation. In alternative embodiments, the films can comprise other color combinations such as white and blue, yellow and blue, red and blue, etc.

Irrespective of the specific colors of the first and second thermoplastic films, the contact areas 210 can have a substantial change in appearance compared to the separated areas 208 when viewed from the first thermoplastic film side of the multi-film thermoplastic structure 202. In some embodiments, for example, when using the LAB color space, a represents a measurement of green and magenta values, b represents a measurement of blue and yellow values, and L represents a measurement of lightness (i.e., white and back values). In some embodiments, the change in appearance of the contact areas 210 comprises a color change in which the L value decreases by at least five points. In some embodiments, the change in appearance of the contact areas 210 comprises a color change in which the L value decreases between five and forty points, between five and thirty points, or between five and twenty points.

For example, the change in appearance of the contact areas 210 may include a perceivable change of color from gray to black. In additional embodiments, the change in appearance of the contact areas 210 may include a perceivable change of color from a first relatively lighter color to a second darker color. For example, the change in appearance may include perceivable change of color from a first light gray to a second dark gray. In other implementations, the change in appearance may include perceivable change of color from a first lighter version of any color to a second darker version of the same color.

As another example, it may allow a film having a viewable blue layer (with a back yellow layer) to have (i.e., mimic) a green appearance. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provided by way of example and not limitation.

FIG. 2 further illustrates that the contact areas 210 optionally secure the thermoplastic films 204, 206 of the multi-film thermoplastic structure 202 such that the thickness of the thermoplastic films 204, 206 is substantially unchanged at each of the contact areas 210. In other words, each of the first and second thermoplastic films 204, 206 can have a substantially uniform gauge (e.g., are substantially flat). In other words, the gauge of the first and second thermoplastic films 204, 206 in the separated areas 208 is substantially the same as the gauge of the first and second thermoplastic films 204, 206 in the contact areas 210. This is in contrast to ring rolled, SELF'ed, conventional embossing, or other processes that can bond film layers together, while also deforming portions of the films. As mentioned above, the heat, pressure, and depth of engagement during creation of the contact areas can control to what extent, if any, the thermoplastic films are deformed when forming the contact areas 210. In one or more implementations, the process of forming the contact areas 210 does not deform, or does not substantially deform, the thermoplastic films such that they are flat, or appear flat, despite the presence of contact areas 210. In alternative implementations, the portions of the first and second thermoplastic films comprising the contact areas 210 create an increase or decrease in the gauge or loft of the multi-film thermoplastic structure 202.

In one or more implementations, the creation of the contact areas 210 does not weaken the first and second thermoplastic films 204, 206. For example, in one or more implementations, film strength in the portions of the first and second thermoplastic films 204, 206 comprising the contact areas 210 is not significantly lower than the portions of the first and second thermoplastic films 204, 206 in the areas 208 of separation. In particular, in one or more implementations, film in the contact areas 210 have transverse direction tensile strength that is the same as the film in the separated areas 208.

Moreover, the creation of the contact areas 210 can create other tactile features in the multi-film thermoplastic structure 202. For example, regions of the multi-film thermoplastic structure 202 including the contact areas 210 can have an increased rigidity over other regions of the multi-film thermoplastic structure 202 without contact areas. In some implementations, the contact areas 210 may increase the rigidity of the multi-film thermoplastic structure 202 by a factor of one. In other implementations, the contact areas 210 may increase the rigidity of the multi-film thermoplastic structure 202 by as much as a factor of three. Alternatively, the contact areas 210 may not increase the rigidity of the multi-film thermoplastic structure 202 at all.

FIGS. 3A-3D illustrate various implementations of contact rollers for forming contact areas. For example, as shown in FIG. 3A, the contact rollers include a punch roll 302 and a cooperating die roll 304. Each of the punch roll 302 and the die roll 304 may be cylindrical and may have longitudinal axes that are parallel to each other. The punch roll 302 and the die roll 304 may define a passage or tooling nip therebetween through which film materials may pass through to form the contact areas. As shown in FIG. 3A, the punch roll 302 is provided with punch elements 308 that extend outward from a surface of the punch roll 302. The die roll 304 is provided with corresponding die recesses 306 that extend into the surface of the die roll 304 for cooperating with, or receiving, the punch elements 308.

As illustrated in the enlargement shown in FIG. 3B, the punch elements 308 may each have a plurality of punch elements for cooperating with corresponding die elements in the die recesses 306. The cooperating engagement of the punch elements with the die elements, with one or more thermoplastic films therebetween, forms contact areas by pressing thermoplastic films together.

FIG. 3C illustrates an alternative set of contact rollers comprise a punch roll 302 and a press roll 310. The press roll 310 may comprise a conformable surface for conforming to the punch elements, or other surface configuration of the punch roll 302. In still further embodiments, the press roll can comprise a rubber roll or roll formed form another conformable material.

FIG. 3D illustrates yet another implementation of contact rollers including a punch roll 302a and a press roll 310. More particularly, the contact rollers of FIG. 3D are sized and configured to create contact areas arranged in text in multi-film thermoplastic structures (e.g., thermoplastic bags). In particular, the punch roll 302a includes punch elements 308a sized and configured to create a first pattern of contact areas comprising text (i.e., a suffocation warning) in a multi-film thermoplastic structure. The punch roll 302a further includes punch elements 308b sized and configured to create a second pattern of contact areas (e.g., a plurality of diamond shaped contact areas). More specifically, as a multi-film thermoplastic structure comprising a darker pigmented thermoplastic film and a lighter or non-pigmented thermoplastic film passes between the contact rollers 302a, 310, the punch elements 308a, 308b of the punch roll 302a presses portions of the thermoplastic films together against the press roll 310. In one or more implementations the punch roller 302a is metallic and heated. The heat and pressure supplied by the contact rollers 302a, 310 form contact areas in the multi-film thermoplastic structure have the shape of the punch elements 308a, 308b of the punch roll 302a.

One of the rolls may be formed from a relatively hard material (e.g., steel, aluminum, ebonite or other suitable hard material), and the other may be formed from a softer material (e.g., rubber or other suitable softer material). For example, the punch roll 302/302a and the cooperating die roll 304 or press roll 310 may include a steel-to-rubber interface. In alternative embodiments, both the punch roll 302/302a and the die/press roll 304/310 may be formed from the relatively hard material (e.g., steel). Put another way, the punch roll 302/302a and the die/press roll 304/310 may include a steel-to-steel interface. Regardless of whether the punch roll 302/302a and the die/press roll 304/310 include a steel-to-rubber interface or a steel-to-steel interface, in one or more implementations, one or more of the contact rollers may include an electrically heated roll (e.g., means of heating). For example, in one embodiment, an aluminum punch roll 302 is internally heated by an electric source and a rubber die/press roll 304/310 is unheated. Alternatively, in at least one embodiment, at least one of the punch roll 302/302a and the die/press roll 304/310 may be externally heated (e.g., by directing a heat source at one or more outer portions of the roll). In alternative embodiments, neither of the contact rollers are heated.

The plurality of punch elements may have height of between about 10.0 mils and about 150.0 mils, and the receiving the die elements may have depth of between about 10.0 mils and about 120.0 mils. In at least one implementation, as shown in FIG. 3B, the punch elements and the correlating die elements can include a plurality of evenly spaced squares forming a repeat unit. In alternative implementations, the punch elements and the correlating die elements can include a plurality of evenly spaced chevron patterns. Alternatively, the punch elements and the correlating die elements can include a plurality of random polygon shaped protrusions and a plurality of matching random polygon shaped recesses to form a mosaic of random polygon shaped recesses.

In at least one embodiment, one or both of the contact rollers 302/302a, 304 and/or the press roll 310 (as shown in FIGS. 3A-3D above) are heated to a temperature between 125 degrees and 324 degrees (Fahrenheit) in order to create the contact areas. Additionally, in at least one embodiment, the contact rollers 302/302a, 304 and/or the press roll 310 may create the contact areas by being positioned so as to create a tooling nip (e.g., a passage) where a multi-film thermoplastic structure passing therein experiences pressure within a range of 100-1800 pounds per square inch. Furthermore, the contact rollers 302/302a, 304 and/or the press roll 310 may create the contact areas by spinning at speeds of 500-1200 feet per minute. In one or more embodiments, the contact rollers 302/302a, 304 and/or 310 may operate within these ranges of heat, pressure, and speed while processing a two-layer thermoplastic film, a four-layer thermoplastic film, an eight-layer thermoplastic film, or a multi-film thermoplastic structure with even more layers. In at least one embodiment, one or both of the contact rollers 302/302a, 304 and/or the press roll 310 are pre-heated along the outer perimeter of the contact rollers 302/302a, 304 and/or the press roll 310 to a temperature within the range described above. Additionally, or alternatively, the multi-film thermoplastic structure may be pre-heated prior to passing through the contact rollers 302/302a, 304 and/or the press roll 310.

Figure 4:
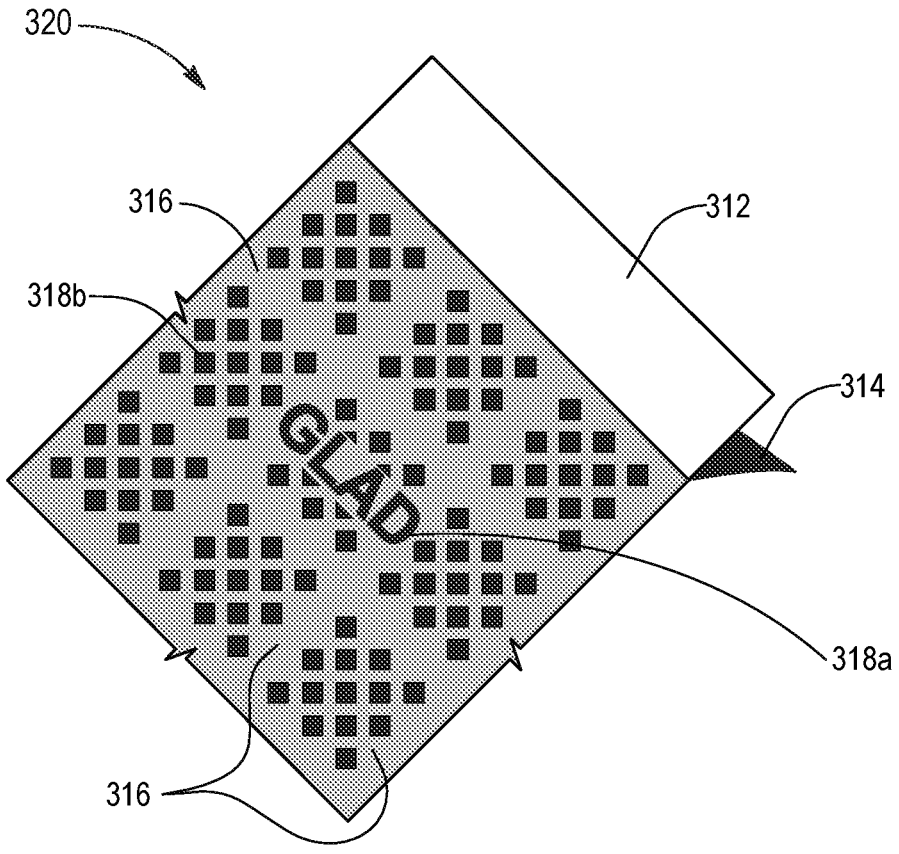
FIG. 4 shows a view of a portion of a multi-film thermoplastic structure having contact areas arranged in text created by a set of contact rollers according to one or more implementations of the present disclosure.

Referring to FIG. 4, a multi-film thermoplastic structure 320 with contact areas arranged in text is illustrated. The multi-film thermoplastic structure 320 includes a first thermoplastic film 312 having a first appearance and a second thermoplastic film 314 having a second appearance. The first appearance is a first color due to a first pigment in the first thermoplastic film 312. Alternatively, the first appearance is a clear appearance due to a lack of pigment. The second appearance is a second color due to a second pigment in the second thermoplastic film 314. As shown in the implementation of FIG. 4, the first color creating the first appearance is lighter color (e.g., white) and the second color creating the second appearance is a darker color (e.g., black).

As shown by FIG. 4, when the first thermoplastic film 312 is superimposed directly over the second thermoplastic film 314, one or more separated portions 316 where the first thermoplastic film 312 and the second thermoplastic film 314 are not in intimate contact but are separated (e.g., by an air gap) have a third appearance differing from the first appearance and the second appearance. In particular, as shown by FIG. 4, the separated portions or areas 316 when viewed from the first thermoplastic film 312 side of the multi-film thermoplastic structure 320 have a third color that differs from the first and second colors. As discussed above, the separated portions or areas 316 when viewed from the first thermoplastic film 312 side of the multi-film thermoplastic structure 320 have the unexpected third appearance despite the multi-film thermoplastic structure 320 being devoid of a pigment of the third color. FIG. 4 illustrates the separated portions or areas 316 when viewed from the first thermoplastic film 312 side having a grey color.

The multi-film thermoplastic structure 320 includes a first pattern of contact areas 318a arranged in text (e.g., arranged to spell "GLAD"). The contact areas 318a arranged in text are formed by a pair of contact rollers similar to the contact rollers 302a, 310. The multi-film thermoplastic structure 320 also includes a second plurality of contact areas 318b arranged in a repeating diamond pattern and separated areas 316 where the films of the multi-film thermoplastic structure 320 are not in intimate contact.

As mentioned above, and as discussed further below, the contact areas 318a, 318b provide a visual impression with significant contrast to the multi-film thermoplastic structure 320. In particular, as shown, the contrast allows the text spelling GLAD to be legible. In other words, the contrast of the contact areas 318a relative to separated portions 316 surrounding the one or more contact areas 318a, when viewed in the first thermoplastic film 312, makes the text legible. Additionally, as mentioned above, the contact areas 318a, 318b can increase a rigidity of the multi-film thermoplastic bag—thereby creating a sturdier and stronger feel in the areas of the multi-film thermoplastic bag including the contact areas 318a, 318b. In any event, in one or more implementations, the contact areas 318a arranged into text have physical parameters that are substantially equal to physical parameters of the multi-film thermoplastic structure 320 in the one or more separated portions 316. For example, the tensile strength of the contact areas 318a arranged into text can comprise the same or substantially equal value as the tensile strength of the separated portions 316.

The contact areas 318a, 318b comprise portions of the multi-film thermoplastic structure 320 where the first thermoplastic film 312 and the second thermoplastic film 314 are in intimate contact. Additionally, the contact areas 318a, 318b comprise the second appearance of the second thermoplastic film 314. In particular, as shown by FIG. 4, the contact areas 318a, 318b comprise the second color (i.e., black).

Furthermore, depending upon the heat and pressure used to form the contact areas 318a, 318b, the contact areas 318a, 318b can form bonds between the first thermoplastic film 312 and the second thermoplastic film 314. In one or more implementations, the bonds of the one or more contact areas 318a arranged into text are configured to separate before either of the first thermoplastic film 312 or the second thermoplastic film 314 fails when subjected to peel forces or forces consistent with use of a trash bag (e.g., loading the trash bag, removing the trash bag from a bin, or carrying a trash bag full of trash). In other words, the bonds of the contact areas 318a can be configured to have a weak bond strength as described above. In alternative implementations, the bonds of the contact areas 318a arranged into text are not configured to separate before either of the first thermoplastic film 312 or the second thermoplastic film 314 fails when subjected to peel forces. In other words, the bonds can have a strong bond strength or be permanent bonds.

Figure 5:
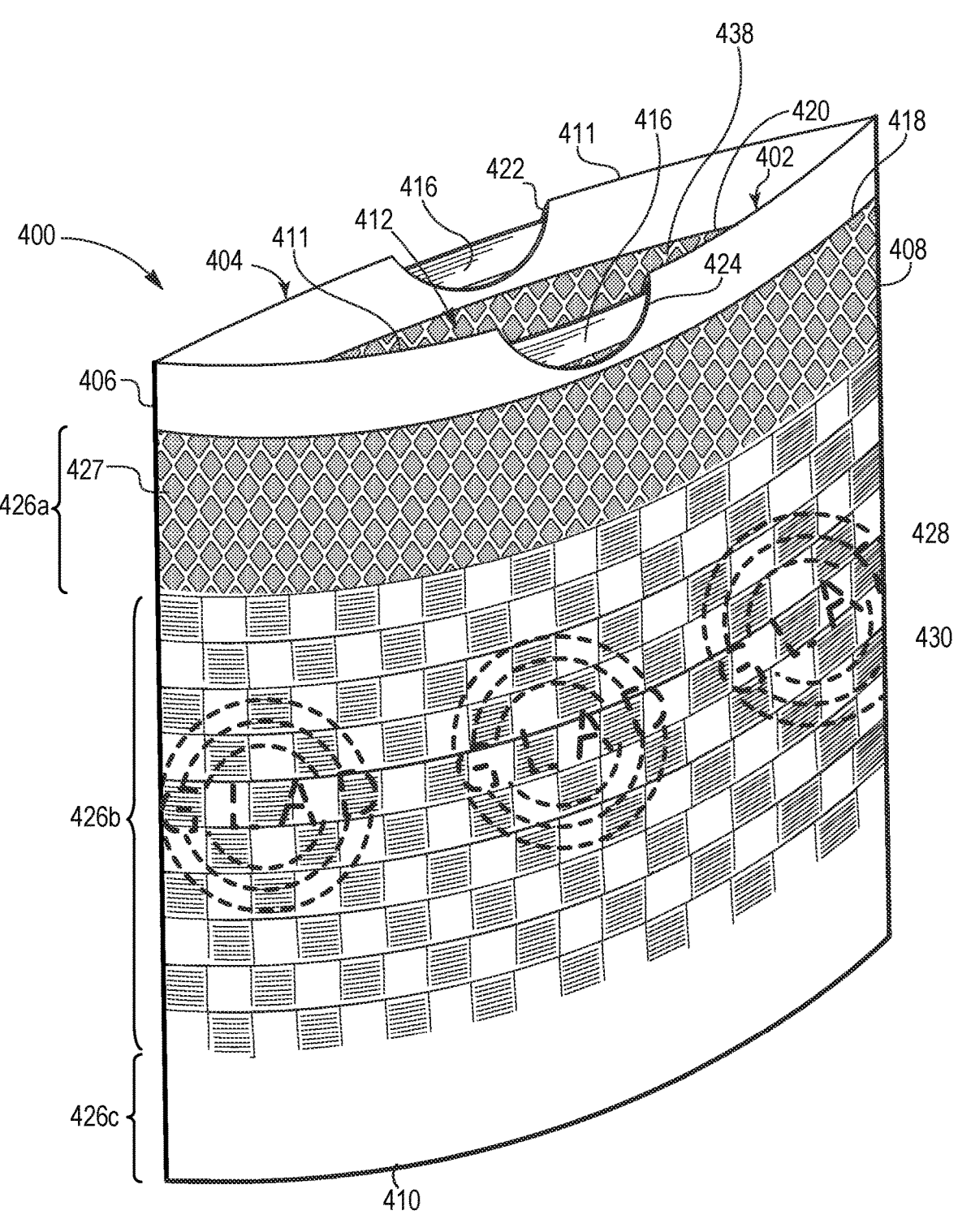
FIG. 5 shows a perspective view of a multi-film thermoplastic bag including contact areas arranged in text according to one or more implementations of the present disclosure.

FIG. 5 is a perspective view of a multi-film thermoplastic bag 400 including contact areas arranged into text according to an implementation of the present disclosure. The multi-film thermoplastic bag 400 includes a first sidewall 402 and a second sidewall 404. Each of the first and second sidewalls 402, 404 includes a first side edge 406, a second opposite side edge 408, a bottom edge 410 extending between the first and second side edges 406, 408. Each of the first and second sidewalls 402, 404 also includes a top edge 411 extending between the first and second side edges 406, 408 opposite the bottom edge 410. In some implementations, the first sidewall 402 and the second sidewall 404 are joined together along the first side edges 406, the second opposite side edges 408, and the bottom edges 410. The first and second sidewalls 402, 404 may be joined along the first and second side edges 406, 408 and bottom edges 410 by any suitable process such as, for example, a heated pressure seal. In alternative implementations, the first and second sidewalls 402, 404 may not be joined along the side edges. Rather, the first and second sidewalls 402, 404 may be a single uniform piece. In other words, the first and second sidewalls 402, 404 may form a sleeve or a balloon structure.

In some implementations, the bottom edge 410 or one or more of the side edges 406, 408 can comprise a fold. In other words, the first and second sidewalls 402, 404 may comprise a single unitary piece of material. The top edges 411 of the first and second sidewalls 402, 404 may define an opening 412 to an interior of the multi-film thermoplastic bag 400. In other words, the opening 412 may be oriented opposite the bottom edge 410 of the multi-film thermoplastic bag 400. Furthermore, when placed in a trash receptacle (e.g., trash can), the top edges 411 of the first and second sidewalls 402, 404 may be folded over the rim of the receptacle.

In some implementations, the multi-film thermoplastic bag 400 may optionally include a closure mechanism located adjacent to the top edges 411 for sealing the top of the multi-film thermoplastic bag 400 to form an at least substantially fully-enclosed container or vessel. As shown in FIG. 5, in some implementations, the closure mechanism comprises a draw tape 416, a first hem seal 418, and a second hem seal 420. In particular, the first top edge 411 of the first sidewall 402 may be folded over into the interior volume and may be attached or secured to an interior surface of the first sidewall 402 by first hem seal 418. Similarly, the second top edge 411 of the second sidewall 404 is folded over into the interior volume and may be attached to an interior surface of the second sidewall 404 by a second hem seal 420. The draw tape 416 extends through hem channels created by the first and second hem seals 418, 420 along the first and second top edges 411. The hem channel created by the first hem seal 418 includes a first aperture 424 (e.g., notch) extending through the hem channel and exposing a portion of the draw tape 416. Similarly, the hem channel created by the second hem seal 420 includes a second aperture 422 extending through the hem channel and exposing another portion of the draw tape 416. During use, pulling the draw tape 416 through the first and second apertures 422, 424 will cause the top edges 411 to constrict. As a result, pulling the draw tape 416 through the first and second apertures 422, 424 will cause the opening 412 of the multi-film thermoplastic bag 400 to at least partially close or reduce in size. The draw tape closure mechanism may be used with any of the implementations of a multi-film thermoplastic bag described herein.

Although the multi-film thermoplastic bag 400 is described herein as including a draw tape closure mechanism, one of ordinary skill in the art will readily recognize that other closure mechanisms may be implemented into the multi-film thermoplastic bag 400. For example, in some implementations, the closure mechanism may include one or more of flaps, adhesive tapes, a tuck and fold closure, an interlocking closure, a slider closure, a zipper closure, or any other closure structures known to those skilled in the art for closing a bag.

Each of the sidewalls 402, 404 of the multi-film thermoplastic bag 400 comprise a multi-film thermoplastic structure, such as that shown in FIG. 2 above. Thus, each sidewall 402, 404 includes at least an inner layer and an outer layer. Indeed, the thermoplastic bag 400 has a bag-in-bag structure. In other words, the thermoplastic bag 400 includes a first bag and a second bag positioned therein. More particularly, the first thermoplastic bag comprises first and second opposing sidewalls joined together along a first side edge, an opposite second side edge, and a closed first bottom edge. The second thermoplastic bag is positioned within the first thermoplastic bag. The second thermoplastic bag comprises third and fourth opposing sidewalls joined together along a third side edge, an opposite fourth side edge, and a closed second bottom edge. In one or more implementations, the first thermoplastic bag (e.g., the outer layer) is pigmented with a first color, and the second thermoplastic bag is pigmented with a second color (e.g., the inner layer is pigmented with the second color). As described above, the differing colors of the layers can allow for the creation of contact areas when the inner bag and the outer bag are placed into intimate contact.

As shown in FIG. 5, the multi-film thermoplastic bag 400 includes a first region or grab zone 426a, a second region 426b, and a third region 426c. In the implementation shown, the first region 426a includes a pattern of contact areas 427. The pattern of contact areas 427 shown in FIG. 5 includes a medium pattern density and exists on the outer and inner surfaces of the first and second sidewalls 402, 404. Additionally, the first region 426a covers a portion of the multi-film thermoplastic bag 400 extending from the first hem seal 418 toward the bottom edge 410 of the multi-film thermoplastic bag 400. Additionally, the pattern of contact areas 427 is registered to the same location on the second sidewall 404 of the multi-film thermoplastic bag 400. The third region 426c of the multi-film thermoplastic bag 400 is a flat portion of the multi-film thermoplastic bag 400.

In one or more implementations, the second region 426b includes a pattern of deformations including at least one of raised rib-like elements in a strainable network or alternating thicker ribs and thinner stretched webs (e.g., SELF'ed or ring rolled patterns). For example, as shown in FIG. 5, the second region 426b includes a checkerboard pattern of SELF'ed squares as described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

As shown by FIG. 5, the checkerboard pattern of deformations can comprise a repeating pattern of raised rib-like elements. In particular, the checkerboard pattern of deformations can include a first plurality of rib-like elements arranged pattern. Portions of the raised rib-like elements of the outer layer can be in direct contact and have the appearance of the inner of the bag 400. In contrast to the pattern of contact areas 427, however, the portions of deformations (e.g., raised rib-like element of a SELFing pattern or alternating thicker ribs and thinner stretched webs of a ring rolling pattern) stretch the film incrementally to create areas of varying gauge or thickness.

As shown in FIG. 5, the multi-film thermoplastic bag 400 includes a second pattern of contact areas 428 forming dashed circles and a third pattern of contact areas 430 forming the text "GLAD." The contact areas 428/430 are formed over the checkerboard pattern of deformations. In other words, the contact areas 428/430 can smash the deformations to form contact areas that contrast with the surrounding portions of the sidewall so the text is visible and legible.

The thermoplastic bag 400, as shown, includes side heat seals along the side edges 406, 408. As shown, the side heat seals can comprise areas in which all four or more layers of the thermoplastic bag are in intimate contact. As such, the side heat seal (and any other heat seals such as a hem seal) can have the same appearance as the contact areas.

As shown by FIG. 5, the contact areas in the grab zone 426a form a diamond pattern 427 that provides the grab zone 426a with a unique visual appearance that connotes strength. Additionally, as mentioned above, the contact areas in the grab zone 426a can provide increased stiffness and other tactile cues that connote strength. As such, the contact areas can provide the grab zone with both a look and feel of increased strength.

While FIG. 5 illustrates a pattern of contact areas 427 comprising repeating diamond-shaped elements, other implementations can comprise differently shaped contact areas. For example, the contact areas can comprise squares, circles, ovals, stars, hexagons, or other shapes. As such, the use of diamond-shaped contact areas is for illustrative purpose and does not limit the implementations of the present invention.

Figure 6A:
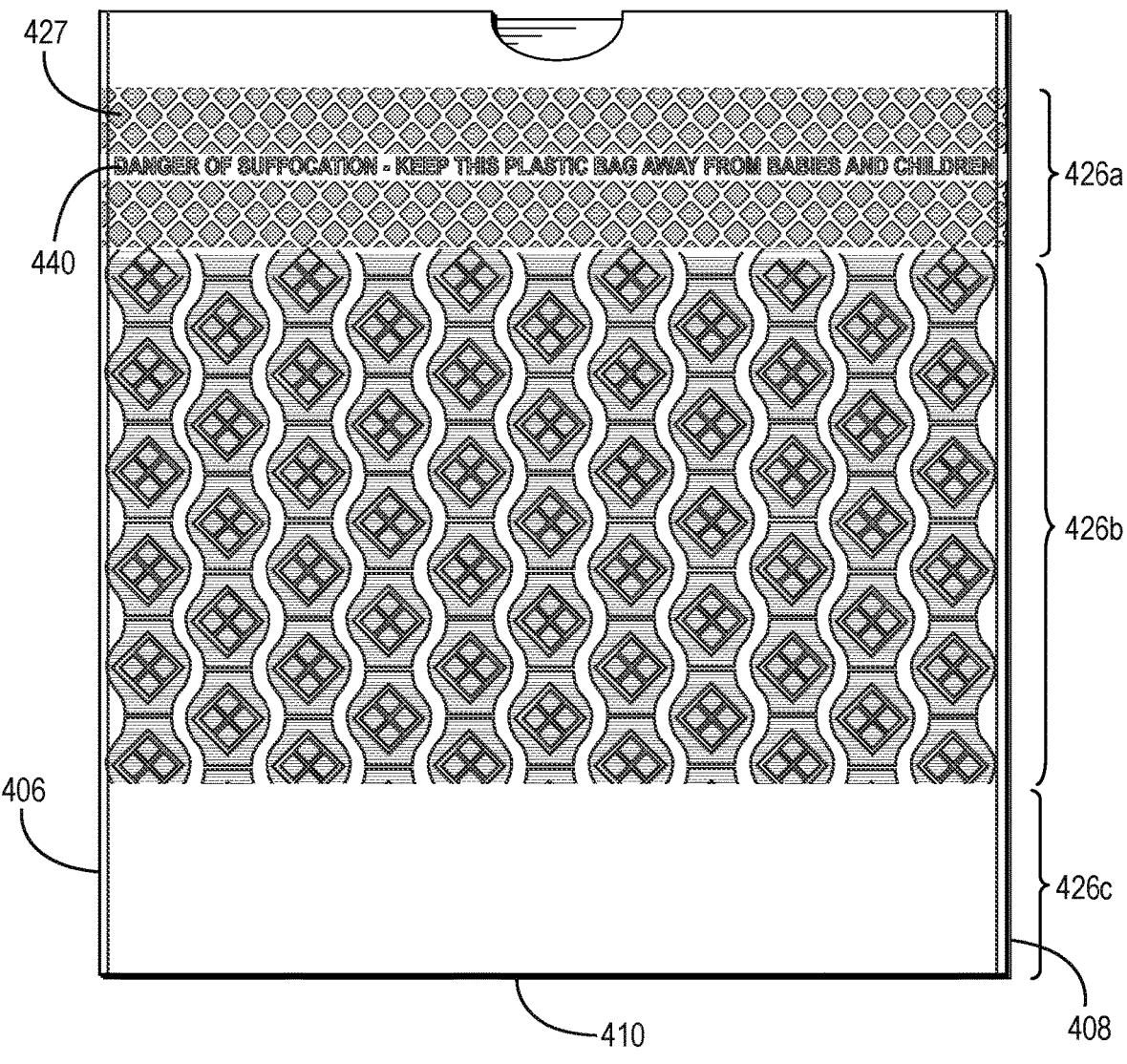
FIG. 6A shows a front view of a multi-film thermoplastic bag including contact areas arranged in text according to one or more implementations of the present disclosure.

FIG. 6A illustrates a front view of a multi-film thermoplastic bag 600 including contact areas arranged into text. The multi-film thermoplastic bag 600 can include many of the same features as the thermoplastic bag 400 described above. The feature of the multi-film thermoplastic bag 600 that are similar to the thermoplastic bag 400 include the same reference numerals.

As shown in FIG. 6A, the multi-film thermoplastic bag 600 includes a first region or grab zone 426a, a second region 426b, and a third region 426c. In the implementation shown, the first region 426a includes a pattern of contact areas 427. The pattern of contact areas 427 shown in FIG. 6A includes a medium pattern density and exists on the outer and inner surfaces of the first and second sidewalls 402, 404 where the individual contact areas are shaped as diamonds. Additionally, the first region 426a covers a portion of the multi-film thermoplastic bag 600 extending from the bottom of the hem channel toward the bottom edge 410 of the multi-layer thermoplastic bag 600. Additionally, the pattern of contact areas 427 is registered to the same location on the second sidewall 404 of the multi-layer thermoplastic bag 600. The third region 426c of the multi-film thermoplastic bag 600 is a flat portion of the multi-layer thermoplastic bag 600.

Additionally, as shown by FIG. 6A, the multi-film thermoplastic bag 600 includes a second plurality of contact areas 440 arranged into text. In particular, the second plurality of contact areas 440 arranged into text form a phrase comprising a suffocation warning. As shown, the second plurality of contact areas 440 arranged into text extend across a width of the multi-film thermoplastic bag 600 from the first side edge 406 toward the opposite second side edge 408.

In one or more implementations the contact rollers used to form the contact areas arranged into text can comprise phased rollers as described in International Patent Application No. PCT/US2020/015580 filed on Jan. 29, 2020 and entitled "THERMOPLASTIC BAGS WITH PHASED DEFORMATION PATTERNS," hereby incorporated by reference in its entirety. For example, one or more implementations involve forming bags using tooling phased relative to a width or height of the thermoplastic bags. More specifically, the tooling (i.e., contact rollers) is sized and configured such that one revolution (or fraction thereof) equals the width or height of a thermoplastic bag. In this manner, the tooling can be configured to generate contact areas arranged into a phrase of text (e.g., a suffocation warning) that is included in its entirety on each bag. In other words, the start and end of the phrase created by the contact areas arranged into text is configured to start and end within the dimensions of each bag. This, as shown in FIG. 6A, the entire message can be less than the width (or height) of the bag thereby ensuring that the entire message is present on a given bag and is not straddle across multiple bags.

Figure 6B:
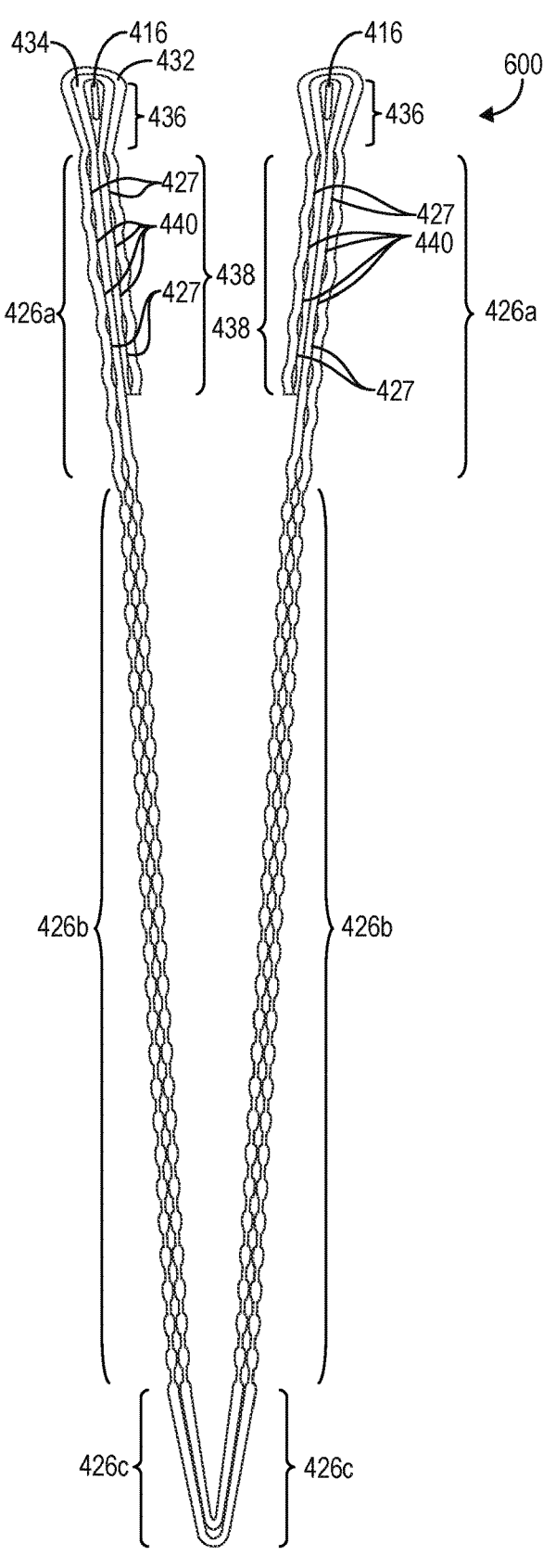
FIG. 6B illustrates a cross-sectional view of the multi-film thermoplastic bag of FIG. 6A according to one or more implementations of the present disclosure.

FIG. 6B illustrates a cross-sectional view of one or more implementations of the multi-film thermoplastic bag 600 shown in FIG. 6A. For example, as shown in FIG. 6B, the multi-film thermoplastic bag 600 includes an outer first thermoplastic bag 432 and an inner second thermoplastic bag 434 positioned within the first thermoplastic bag 432. The top edges of the first thermoplastic bag 432 and the second thermoplastic bag 434 are folded over the draw tape 416 to form a hem channel 436. In one or more implementations, the draw tape 416 is movable in the hem channel 436 so as to cinch the multi-film thermoplastic bag 600 closed when pulled through the draw tape apertures. In the embodiment illustrated in FIG. 6B, the hem channel 436 is secured or held in place by a hem seal made up of the contact areas 427, 440. In particular, the hem seal of contact areas 427, 440 comprises a seal formed in a single operation (e.g., layers of the thermoplastic bag 600) through the contact rollers 310, 302a described above in relation to FIG. 3D. In contrast to the hem seal 418, the hem seal of contact areas 427, 440 is formed by contact rollers rather than a seal bar. The hem seal of contact areas 427, 440 secures the hem channel 436. In particular, the hem seal of contact areas 427, 440 secure the hem skirt 438 to the inner second thermoplastic bag 434. Optionally, the hem seal of contact areas 427, 440 secures the outer first thermoplastic bag 432, the inner second thermoplastic bag 434, and the layers of the hem skirt 438 together. Referring to FIG. 6A, the hem seal of contact areas 427, 440 comprises the contact areas in the first region 426a. The hem seal of contact areas 427, 440 is a single seal in that it is formed in a single operation despite the presence of different zones of contact areas (e.g., contact areas 427, followed by contact areas 440, followed by contact areas 427).

As discussed above, the sidewalls of the multi-film thermoplastic bag 600 can include the first region 426a, the second region 426b, and the third region 426c, where each region includes different bonding, or no bonding, between the first thermoplastic bag 432 and the second thermoplastic bag 434. For example, as shown in FIG. 6B, the first region 426a includes contact areas 427, 440 between the first thermoplastic bag 432 and the second thermoplastic bag 434 where the first thermoplastic bag 432 and the second thermoplastic bag 434 have been brought into intimate contact via any of the processes described above, while leaving the thickness of the bags 432, 434 substantially unchanged in the first region 426a. The second region 426b includes areas of a plurality of deformations, where the plurality of deformations includes alternating thicker ribs and thinner stretched webs between the first and second bags 432, 434. The third region 426c includes an area that is flat and undeformed between the first and second bags 432, 434.

As further shown in FIG. 6B, folding over the top edges of the first and second bags 432, 434 creates a hem skirt 438 extending from the hem seals 418, 420 down an inner surface of the second thermoplastic bag 434. As shown, the hem skirt 438 includes portions of the first and second bags 432, 434 that are the same length, where the length (distance from the hem channel toward the bottom of the bag) of the hem skirt 438. The hem skirt 438 may have a length of in a first range of about 0.1 inch (0.254 cm) to about 10 inches (25.4 cm), a second range of about 0.5 inches (1.27 cm) to about 8 inches (20.3 cm), a third range of about 1 inches (2.54 cm) to about 6 inches (15.2 cm), a fourth range of about 3 inches (7.6 cm) to about 6 inches (15.2 cm). In one or more implementations, the hem skirt 438 has a length of 0.5 inches (1.27 cm). In another implementation, the hem skirt 438 has a length of 4 inches (10.2 cm). In one implementation, the hem skirt 438 has a length of 5 inches (12.7 cm). In another implementation, the hem skirt 438 has a length that is shorter or longer than the examples listed above.

The grab zone or first region 426a may have a length (distance the grab zone extends from the hem channel toward the bottom of the bag) of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 3 inches (7.6 cm) to about 6 inches (15.2 cm). In one implementation, the grab zone has a length of 5 inches (12.7 cm). In a further implementation, the grab zone has a length of 4 inches (10.2 cm). In another implementation, the grab zone has a length that is shorter or longer than the examples listed above.

Furthermore, the hem skirt 438 can have a length that is co-extensive or the same length as the grab zone 426a. Alternatively, the hem skirt 438 has a length less than a length of the grab zone 426a. For example, FIG. 6B illustrates that the hem skirt 438 has a length approximately 66% of the length of the grab zone 426a. In alternative implementations, the hem skirt 438 has a length approximately 10%, 20% 25% 33%, 50%, 75%, 80% or 90% of the length of the grab zone 426a. In another implementation, the hem skirt 438 has a length that is relatively shorter or longer than the examples listed above compared to the grab zone 426a.

For example, in one or more implementations, the hem skirt 438 is longer than the grab zone 426a.

As further shown in FIG. 6B, the contact areas 427, 440 in the first region 426a extends through the hem skirt 438. For example, in at least one implementation, the contact areas 427, 440 in the first region 426a are formed after the top edges of the first and second bags 432, 434 are folded over and secured via the hem seals 418, 420. Thus, the process that forms the contact area 427, 440 (e.g., via the contact rollers 302, 304 and/or the press roll 310 shown in FIGS. 3A-3D above) also forms contact areas 427, 440 between the first and second bags 432, 434 in the hem skirt 438, and contact areas 427, 440 between the sidewalls of the bag 400 and the hem skirt 438. The contact areas 427, 440 in the hem skirt 438 in combination with the contact areas 427 in the outer portion of the multi-film thermoplastic bag 600 can create rigidity in the multi-film thermoplastic bag 600 in the grab zone that is 0-3 greater than the rigidity of the multi-film thermoplastic bag 600 in the other regions.

The portions of the first and second bags 432, 434 forming the hem skirts can be the same length or different lengths. For example, the top edge of the outer first thermoplastic bag 432 can extend a greater length in the hem skirt 438 than the top edge of the inner second thermoplastic bag 434. In some implementations, the longer edge of the first thermoplastic bag 432 may be unattached from the inner surface of the second thermoplastic bag 434 by contact areas. In other implementations, the longer edge of the first thermoplastic bag 432 may be in contact with the inner surface of the second thermoplastic bag 434 via one or more contact areas, or another type of lamination.

The number of films (e.g., layers) that the contact areas 427, 440 bond together can vary in different implementations. For example, the contact areas 427, 440 can secure two layers (e.g., the two films of the sidewall), the contact areas 427, 440 can secure three layers (e.g., the two films of the sidewall and one of the films extending along the inside of the sidewall), or the contact areas 427, 440 can secure four layers (e.g., the two films of the sidewall and both of the films extending along the inside of the sidewall). The more layers bonded by the contact areas 427, 440, the greater the stiffness and reinforcement.

In yet another implementation, the top edge of the inner second thermoplastic bag 434 may extend beyond the top edge of the outer first thermoplastic bag 432. For example, the top edge of the inner second thermoplastic bag 434 may extend any distance beyond the top edge of the outer first thermoplastic bag 432. In another implementation, the hem skirt 438 may only include either the top edge of the outer first thermoplastic bag 432 or the top edge of the inner second thermoplastic bag 434. In that implementation the hem skirt 438 may include contact areas 427, 440 between either the top edge of the outer first thermoplastic bag 432 or the top edge of the inner second thermoplastic bag 434 and the inner surface of the inner second thermoplastic bag 434. Accordingly, the contact areas 427, 440 can be between two, three, or four layers of the multi-film thermoplastic bag 600.

Figure 6C:
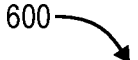
FIG. 6C shows a front view of an inside of the multi-film thermoplastic bag including contact areas arranged in text of FIG. 6A according to one or more implementations of the present disclosure.

FIG. 6C illustrates an inside of the multi-film thermoplastic bag 600. In other words, FIG. 6C illustrates a view looking from the inside of the multi-film thermoplastic bag 600 toward the inner surface of the inner second thermoplastic bag 434. In the implementation of multi-film thermoplastic bag 600 shown in FIGS. 6A-6C, the outer first thermoplastic bag 432 (or outer film of the sidewall) has a first color (e.g., a lighter color). The inner second thermoplastic bag 434 (or inner film of the sidewall) has a second color (e.g., a darker color). As described above in relation to FIG. 4, this allows the multi-film thermoplastic bag 600 to have contact areas 440 formed or arranged into text that differ in appearance from separated portions (areas in which the inner second thermoplastic bag 434 is not in intimate contact with the outer first thermoplastic bag 432) surrounding the contact areas 440 making the text legible when viewed in the outer first thermoplastic bag 432 as shown in FIG. 6A. As shown in FIG. 6C, however, the multi-film thermoplastic bag 600 is configured to reduce legibility of the text created by the contact areas 440 when viewed from an inside of the multi-film thermoplastic bag 600. In particular, in the implementation shown in FIG. 6C, the hem skirt 438 ends above the contact areas 440. As shown when viewing the text created by the contact areas 440 in the second thermoplastic bag 434 (or inner film of the sidewall) due to the darker color of the second thermoplastic bag 434 the text has reduced visibility and legibility. Because the text is reversed when viewed in the second thermoplastic bag 434 (or inner film of the sidewall), the reduced legibility of the text can reduce confusion.

Figure 7:
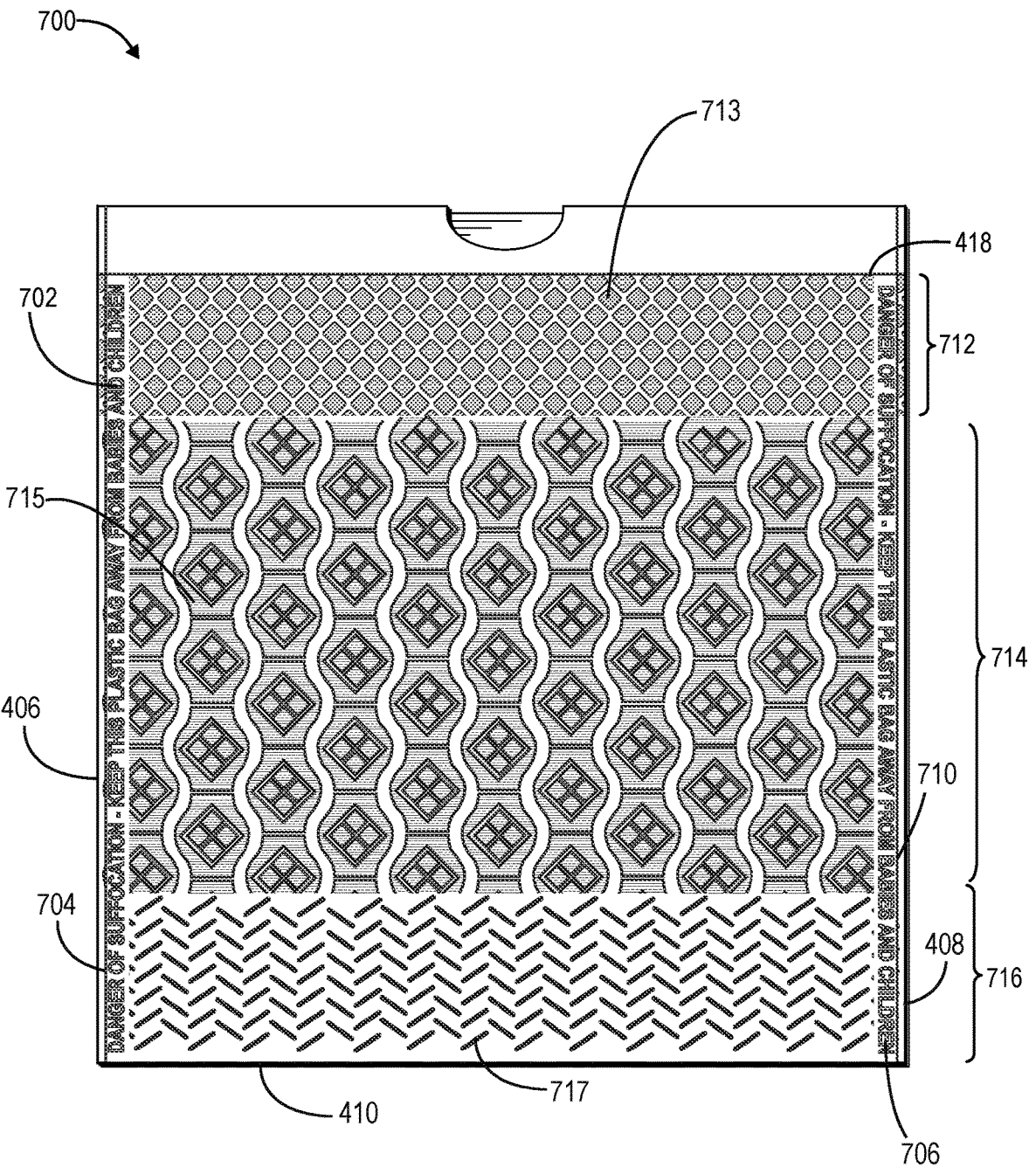
FIG. 7 shows a front view of another multi-film thermoplastic bag including contact areas arranged in text according to one or more implementations of the present disclosure.

While multi-film thermoplastic bags 400 and 600 described above each included contact areas formed into text that extend along the width of the bags, alternative implementations include text formed by contact areas that extend vertically or diagonally. For example, FIG. 7 illustrates a front view of a multi-film thermoplastic bag 700 that includes a first plurality of contact areas 702 arranged into text that extend vertically adjacent to the first side edge 406 and side heat seal 704 from the proximate the bottom edge 410 to just below the hem seal 418. Furthermore, the multi-film thermoplastic bag 700 that includes a second plurality of contact areas 706 arranged into text that extend vertically adjacent to the second side edge 408 and side heat seal 710 from the just below the hem seal 418 to the bottom edge 410. As shown in FIG. 7 both the first plurality of contact areas 702 and the second plurality of contact areas 706 are arranged into text including a suffocation warning.

In one or more implementations, one or more contact areas other than contact areas arranged into text can be positioned in various portions of a multi-film thermoplastic bag 700. FIG. 7 illustrates regions of contact areas. The regions of contact areas reduce puncturing and tearing in association with a grab zone of the multi-film thermoplastic bag. Moreover, the regions of contact areas provide increased stiffness as well as other tactile cues connoting strength. As such, the grab zones of contact areas illustrated in provide both the look and feel of increased strength in areas of the multi-film thermoplastic bag most likely to be handled by a user.

For example, as shown in FIG. 7, the multi-film thermoplastic bag 700 includes a first region 712 of contact areas 713 extending from the hem seal 418. The contact areas 713 comprise diamond shapes and are positioned within a grab zone.

A second region 714 includes a plurality of deformations 715 (e.g., formed by SELFing). As shown, the second region 714 includes a pattern of deformations 715 that includes diamonds and wavy lines. Additionally, the pattern of elements can take up any percentage of the second region 714. For example, the pattern of elements in the second region 714 can be a SELF'ing or ring rolling pattern. In particular, the second region 714 includes a SELFing pattern of bulbous areas with nested diamonds. Wavy land areas separate the SELFing patterns. In some implementations, the wavy land areas may be contact areas in addition to the contact areas in the first region 712. In particular, the techniques described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

The multi-film thermoplastic bag 700 also includes the third region 716 including a second pattern of contact areas 717. In the implementation shown, the first region of contact areas may function as a "grab zone," while the third region 716 of contact areas may function as reinforcement for the bottom of the multi-film thermoplastic bag 700. The contact areas 717 include linear contact areas forming a repeating pattern.

Figure 8:
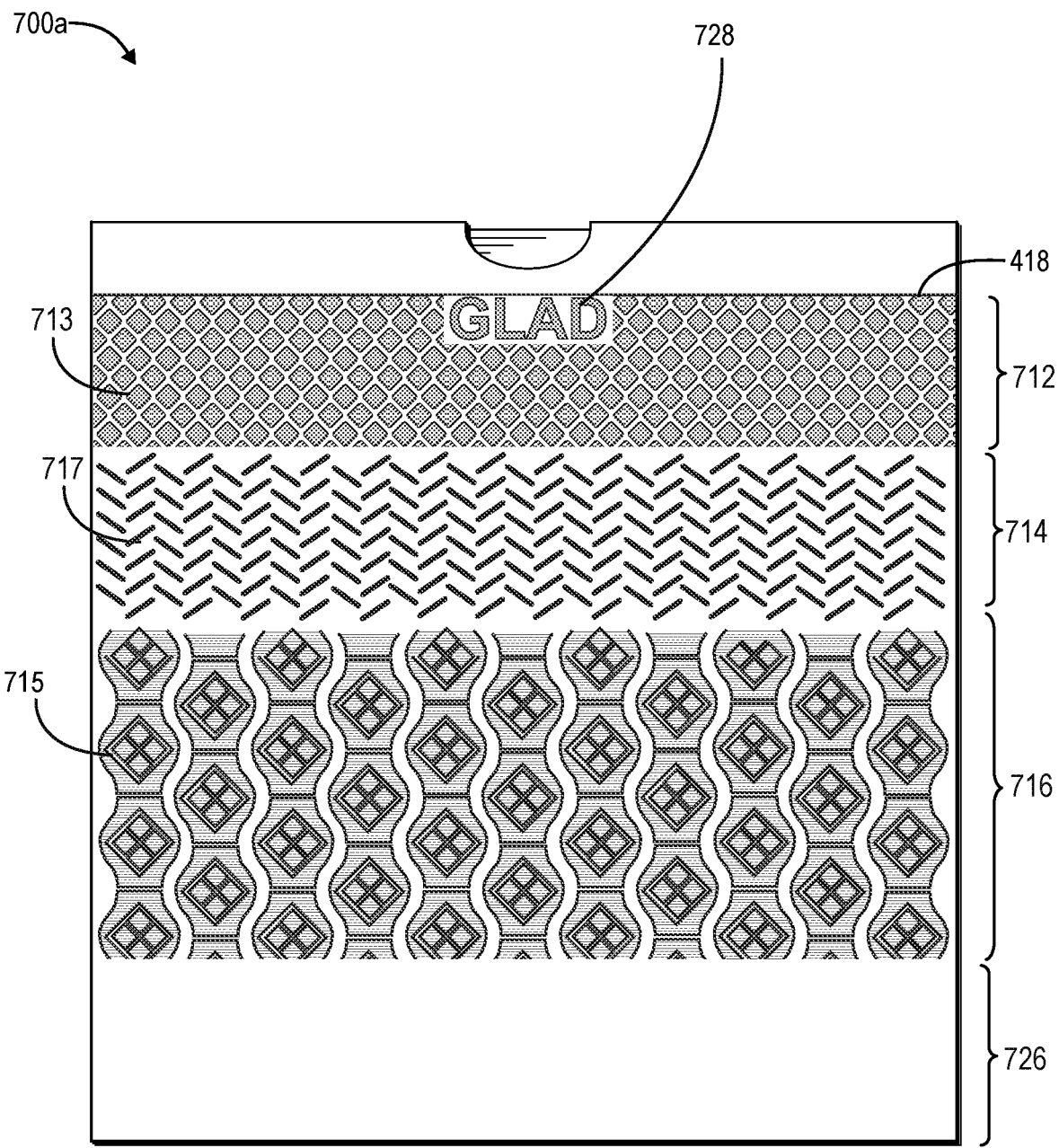
FIG. 8 shows a front view of yet another multi-film thermoplastic bag including contact areas arranged in text according to one or more implementations of the present disclosure.

In one or more implementations, a multi-film thermoplastic bag can include multiple areas of contact areas in various patterns and locations. For example, FIG. 8 shows the multi-film thermoplastic bag 700a with a first region 712 of contact areas 713 extending from the hem seal 418. The contact areas 713 comprise diamond shapes and are positioned within a grab zone. A second region 714 includes contact areas 717 in a second pattern extending from the first region 712. In one or more implementations, the contact areas 713 may serve to increase the tactile cues of strength and durability (as they are positioned within the grab zone), while the contact areas 717 may serve to increase the visual cues of strength and durability. As shown, the multi-film thermoplastic bag 700a in FIG. 8 includes a third region 716 of deformations 715, as discussed above, and a fourth region 726 of flat and undeformed film adjacent to the bottom of the multi-film thermoplastic bag 700a. In some implementations, the multiple areas of contact areas can be formed into patterns including alpha-numeric characters (e.g., text). For example, as further shown in FIG. 8, the contact areas 728 are formed into words (e.g., "GLAD"). In other implementations, the multiple areas of contact areas can be formed into words including brand names, claims, and instructions as described above.

As described above in relation to FIG. 4, in order to form contact areas that are visible, a multi-film thermoplastic structure includes a lighter colored film and a darker colored film. The bags 400, 600, 700, and 700a provide the two layers in the form of a multi-film thermoplastic bag. For example, the bags 400, 600, 700, and 700a comprises a bag-in-bag configuration with an inner bag and an outer bag. Alternatively, the bags 400, 600, 700, and 700a can comprise multi-film sidewalls with each sidewall comprising an inner film and an outer film. In still further implementations, the sidewalls can comprise more than two films. In still further implementations, a thermoplastic bag with contact areas arranged into text includes a single film or layered bag. In such implementations, a film insert smaller than a sidewall is secured to a sidewall to allow for the formation of contact areas formed into text.

Figure 9A:
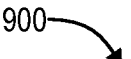
FIG. 9A shows a front view of a thermoplastic bag including an insert and contact areas between the insert and the thermoplastic bag arranged in text according to one or more implementations of the present disclosure.

For example, FIGS. 9A and 9B illustrates a single-film thermoplastic bag 900 with contact areas 901 formed into text (e.g., GLAD in a repeating pattern). In particular, the single-film thermoplastic bag 900 includes a first sidewall 902 comprising a single film and an opposing second sidewall 904 comprising a single film. Each sidewall 902, 904 of the single-film thermoplastic bag 900 can comprise a hem seal 905 to form a hem 912 that holds a draw tape 914. The hem seal 905 of each sidewall 902, 904 can extend from a first side edge 906 to an opposing side edge 908. Furthermore, side heat seals can run along the first and second side edges 906, 908 to secure the first and second sidewalls 902, 904 together.

As shown by FIGS. 9A and 9B, a strip of thermoplastic film 920 is positioned within the single-film thermoplastic bag 900. The strip of thermoplastic film 920 can comprise a second film in a multi-film thermoplastic structure with contact areas arranged into text. For example, the strip of thermoplastic film 920 is bonded to the first thermoplastic film sidewall 902 by the contact areas 901 arranged into text. The difference in appearance of the strip of thermoplastic film 920 compared to the single-film thermoplastic bag 900 can create the contrast that allows the text created by the contact areas 901 to be visible/legible as described above.

While FIGS. 9A-9B illustrate the strip of thermoplastic film 920 being positioned against both the first and second thermoplastic film sidewalls 902, 904, in alternative implementations the strip of thermoplastic film 920 is positioned against and bonded to only one of the first and second thermoplastic film sidewalls 902, 904. Furthermore, while FIGS. 9A-9B illustrate the strip of thermoplastic film 920 being positioned near the bottom 910 of the single-film thermoplastic bag 900, in alternative implementations the strip of thermoplastic film 920 is positioned in the middle, along the sides, in the grab zone, or another position of the single-film thermoplastic bag 900.

In addition, one or more implementations, the thermoplastic material of the strip of thermoplastic film 920 is selected to be different from the thermoplastic material of the sidewalls of the bag 900. The differing material properties of the various films of the multi-film thermoplastic structures with contact areas formed into text provide the structures with the functional benefits of the individual films in a manner that the weakest layer(s) does not dominate the overall structure. In other words, unlike co-extruded films, one or more implementations combine different films in a manner (e.g., non-continuous bonding) that enables the strengths of each film to be utilized without having a weakness of one film directly compromise another film.

One or more implementations include non-continuously laminated structure of thermoplastic films with unique combinations of functional benefits from the individual thermoplastic-films. For example, one or more implementations combine individual films with differing material compositions and functional benefits. For example, a first film can comprise one or more of the scuff resistance, toughness, stretch-ability, impact resistance, high tensile strength, etc., and a second film non-continuously bonded to the first film can comprise another of the scuff resistance, toughness, stretch-ability, impact resistance, high tensile strength, etc. Thus, multi-film thermoplastic structures with contact areas formed into text can provide varied functional benefits typically non present in a single or co-extruded film. Furthermore, one or more implementations comprise combinations of functional benefits not feasible in co-extruded films due to the tendency of the differing material compositions of the layers to resist melt bonding or otherwise make the films unsuitable for co-extrusion (e.g., differing shrink rates).

Still further, one or more implementations comprise multi-film thermoplastic structures with contact areas formed into text with combinations of functional benefits that are typically not possible in a single film. In particular, one or more implementations comprise multi-film thermoplastic structures with contact areas formed into text with functional benefits that are typically trade-offs or otherwise opposed. For example, one or more implementations comprise multi-film thermoplastic structures with contact areas formed into text with both scuff resistance and high tensile strength, with both stretch-ability and high tensile strength, with both impact resistance and high tensile strength, or with both tear resistance and high tensile strength.

Thus, the first and second thermoplastic film sidewalls 902, 904 and the strip of thermoplastic film 920 can each comprise films of thermoplastic material. In particular, first and second thermoplastic film sidewalls 902, 904 and the strip of thermoplastic film 920 can comprise any of the thermoplastic materials described hereinabove, or combinations thereof. In one or more implementations, the first and second thermoplastic film sidewalls 902, 904 can comprise the same thermoplastic material as strip of thermoplastic film 920. In alternative implementations, the strip of thermoplastic film 920 can comprise a different thermoplastic material than the first and second thermoplastic film sidewalls 902, 904. For example, the material of the strip of thermoplastic film 920 may have a higher tensile strength, tear resistance, puncture resistance, elasticity, and/or abrasion resistance than the material of the first and second thermoplastic film sidewalls 902, 904. A strip of thermoplastic film 920 made of stronger and/or tougher material may help further protect the bag 100 against rupture and/or puncture.

Figure 10:
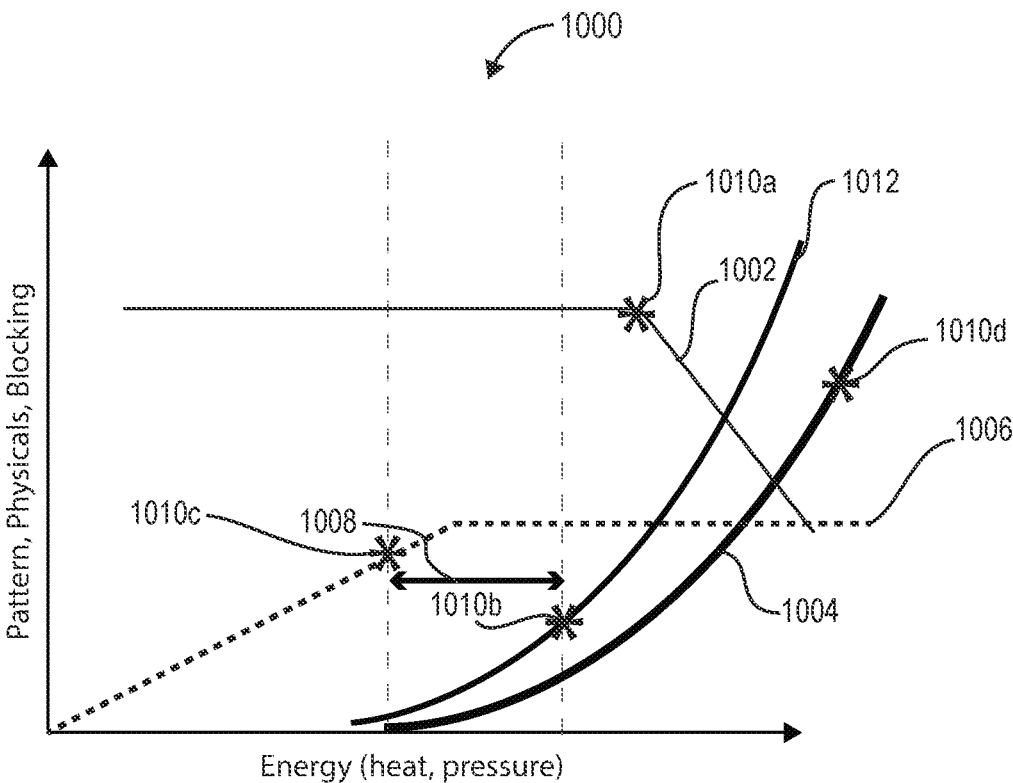
FIG. 10 shows a chart illustrating levels of heat and pressure applied during the contact area creation process according to one or more implementations of the present disclosure.

As mentioned above, in at least one implementation, the contact areas between portions of thermoplastic film layers of a multi-film thermoplastic structure are formed passing through contact rollers in a process that includes applying heat and pressure to the portions of thermoplastic film layers. FIG. 10 includes a chart 1000 illustrating an optimal amount of heat and pressure applied during the heat embossing process that results in preferred quality measures (e.g., visual or pattern, physicals, blocking, and holes) of the resulting multi-film thermoplastic structure.

For example, as shown in FIG. 10, as heat and pressure increase, the physical properties of a multi-film thermoplastic structure indicated by the curve 1002 remain the same until a drop off point 1010a (e.g., yield point). After the drop off point 1010a, the continued increase of heat and pressure cause the physical properties of the multi-film thermoplastic structure to deteriorate rapidly. As used herein, the "physical properties," "physical parameters," or "physicals" of a multi-film thermoplastic structure refer to the molecular strength of the multi-film thermoplastic structure. In particular, the physicals indicated by curve 1002 can comprise transverse direction tensile strength, transverse or machine direction tear resistance, or puncture resistance (e.g., as measured by a dart drop test).

As further shown in FIG. 10, as heat and pressure increase in the process, the blocking of the multi-film thermoplastic structure indicated by the curve 1004 increases in approximately an exponential manner. As used herein, "blocking" refers to the level with which a thermoplastic film sticks to itself. As indicated by the point 1010b on the curve 1012, there is an amount of heat and pressure beyond which the amount of blocking exhibited by a multi-film thermoplastic structure is undesirable. For example, a high level of blocking can cause the multi-film thermoplastic structure to self-stick in such a way that it is unusable for the processes described herein. In particular, by at least point 1010b the films are sealed together in a manner that they cannot be separated without causing the individual layers to fail.

Moreover, as shown in FIG. 10, as heat and pressure increase in the heat embossing process, the aesthetic value (e.g., the visibility as measured by A E) of the pattern of heated pressure seals formed by the heat embossing process increases, as indicated by the curve 1006. For example, as indicated by the point 1010c, an increasing amount of heat and pressure during the heat embossing process causes the aesthetic value of the pattern of contact areas pressed into the multi-film thermoplastic structure to increase to a desirable level. Below this critical level of energy at 110c, the aesthetic value may result in a pattern of contact areas that is difficult to recognize, unnuanced, or otherwise undesirable.

In one or more implementations, increasing heat and pressure during the heat embossing process also increases a flexural rigidity (or stiffness) of the multi-film thermoplastic structure. For example, flexural rigidity refers to a measure of flexibility or rigidity of the multi-film thermoplastic structure. In at least one implementation, the flexural rigidity of the multi-film thermoplastic structure increases in a linearly proportional manner as heat and pressure increase in the contact area formation process until a point where the rigidity plateaus. An increased amount of flexural rigidity in the multi-film thermoplastic structure is desirable as it creates an increased perception of strength and quality of the multi-film thermoplastic bag where the contact areas are incorporated. In one or more implementations, the contact areas can increase the flexural rigidity [microjoule/m] from 1.1 times to 5 times compared to a flat/undeformed film of the same gauge. More particularly, in one or more implementations, the contact areas can increase the flexural rigidity from 1.5 times to 4 times, or 1.5 times to 3 times, or 2 times to 4 times compared to a flat/undeformed film of the same gauge.

Flexural rigidity of the multi-film thermoplastic structure can be measured according to a cantilever test and/or a heart loop test as described in ASTM standard D1388-18. For example, the cantilever test measures flexural rigidity by sliding a strip of the multi-film thermoplastic structure at a specified rate in a direction parallel to its long dimension, until a leading edge of the strip projects from the edge of a horizontal surface. The length of the overhang of the strip is measured when the end of the strip is depressed under its own mass to the point where end of the strip droops by at least a 41.5 degree angle from the horizontal. The flexural rigidity of the multi-film thermoplastic structure is determined based on the length of the overhang. The heart loop test measures flexural rigidity by forming a strip of the multi-film thermoplastic structure into a heart-shaped loop. The length of the loop is measured when it is hanging vertically under its own mass. The flexural rigidity of the multi-film thermoplastic structure is determined based on the length of the loop. Additionally, as shown in FIG. 10, increasing heat and pressure can cause a creation of holes (e.g., micro pores or larger holes) within a multi-film thermoplastic structure. As illustrated, it is possible for the process to create holes in the multi-film thermoplastic structure prior to any significant loss of other physicals (e.g., the molecular strength of the multi-film thermoplastic structure). For example, an amount of heat and pressure beyond the point 1010d can cause holes to form within one or more layers of the multi-film thermoplastic structure. Holes within the multi-film thermoplastic structure are generally undesirable as they may make the multi-film thermoplastic structure unfit for its intended purpose (e.g., lead to leaks in a trash bag).

Thus, as shown by the arrow 1008 in the chart 1000, there is a range of heat and pressure that can be applied during the contact area creation process that results in optimized levels for physicals, blocking, pattern (i.e., visual), flexural rigidity, and holes. In one or more implementations, this range includes heating at least one contact roller to a range of 125-325 degrees Fahrenheit. Furthermore, the range includes pressure in the tooling nip at a range of 100-1100 pounds per square inch. Moreover, in at least one implementation, the range also includes speeds of the contact rollers at a range of 500-1200 feet per minute. In alternative implementations, the preferred range may include heats, pressures, or speeds at other ranges.

When operated within the ranges of heat and pressure indicated by the arrow 1008 in the chart 1000, the contact areas creation process described herein produces contact areas with optimized qualities. For example, in at least one embodiment, a contact area created by the process operating within the optimal heat and pressure ranges exhibits a pattern where the Delta E of the pattern versus separated areas of the films is 0.3 to 50 points higher and more specifically 1.0 to 10.3 points higher. For example, Delta E can refer to the visibility of the contact area and can include one or more of a change in L luminance value associated with the contact area, a change in a-measure of red/green lightness/darkness associated with the contact area, or a change in a b-measure of blue/yellow lightness/darkness associated with the contact area. In one or more implementations, a contact area created by the process operating within the optimal heat and pressure range indicated by the arrow 1008 exhibits a pattern where the Delta E of the pattern versus adjacent separated areas of film is 3.1 points higher on average.

Similarly, in at least one embodiment, a contact area created by the process operating within the optimal heat and pressure range indicated by the arrow 1008 exhibits physicals where the peak load ratio of the areas including the contact area is between 38% and 100% of the TD tensile strength the films prior to formation of the contact area when measured on a one-inch TD tensile pull test. More specifically the contact area is between 54% and 100% of the TD tensile strength the films prior to formation of the contact area. In one or more implementations, a contact area created by the process operating within the optimal heat and pressure range indicated by the arrow 1008 exhibits physicals where the peak load ratio of the contact area is 92% of the TD tensile strength of the pre-processed film. In at least one embodiment, the contact area created by the process operating within the optimal heat and pressure range indicated by the arrow 1008 can also exhibit desired levels of puncture resistance and tear values (in the machine and/or transverse direction).

Moreover, in at least one embodiment, a contact area created by the process operating within the optimal heat and pressure range indicated by the arrow 1008 exhibits blocking where the peel strength [g/mm] is between 0.00 and 5.20, between 0.00 and 2.60, between 0.00 and 1.70, or between 0.00 and 0.88 when peel forces are exerted on a three-inch T peel between inner bag layers. Specifically, a contact area created by the process operating with the optimal heat and pressure ranges exhibits blocking where the peel strength [g/mm] is 0.29 when peel forces are exerted on a three-inch T peel between inner bag layers. Additionally, in at least one implementation, the contact areas are configured to separate before any layer of the multi-film film or bag fails when subjected to peel forces.

Additionally, as shown in FIG. 10, a contact area created by the process operating within the optimal heat and pressure range indicated by the arrow 1008 also exhibits minimal holes. For example, in at least one embodiment, holes may be identified by inflating the multi-film thermoplastic structure including the contact area and checking for light show-through. Holes and blocking associated with multi-film thermoplastic structure may be minimized while maximizing visual and physicals by operating the process within the heat and pressure range indicated by the arrow 1008.

Figure 11:
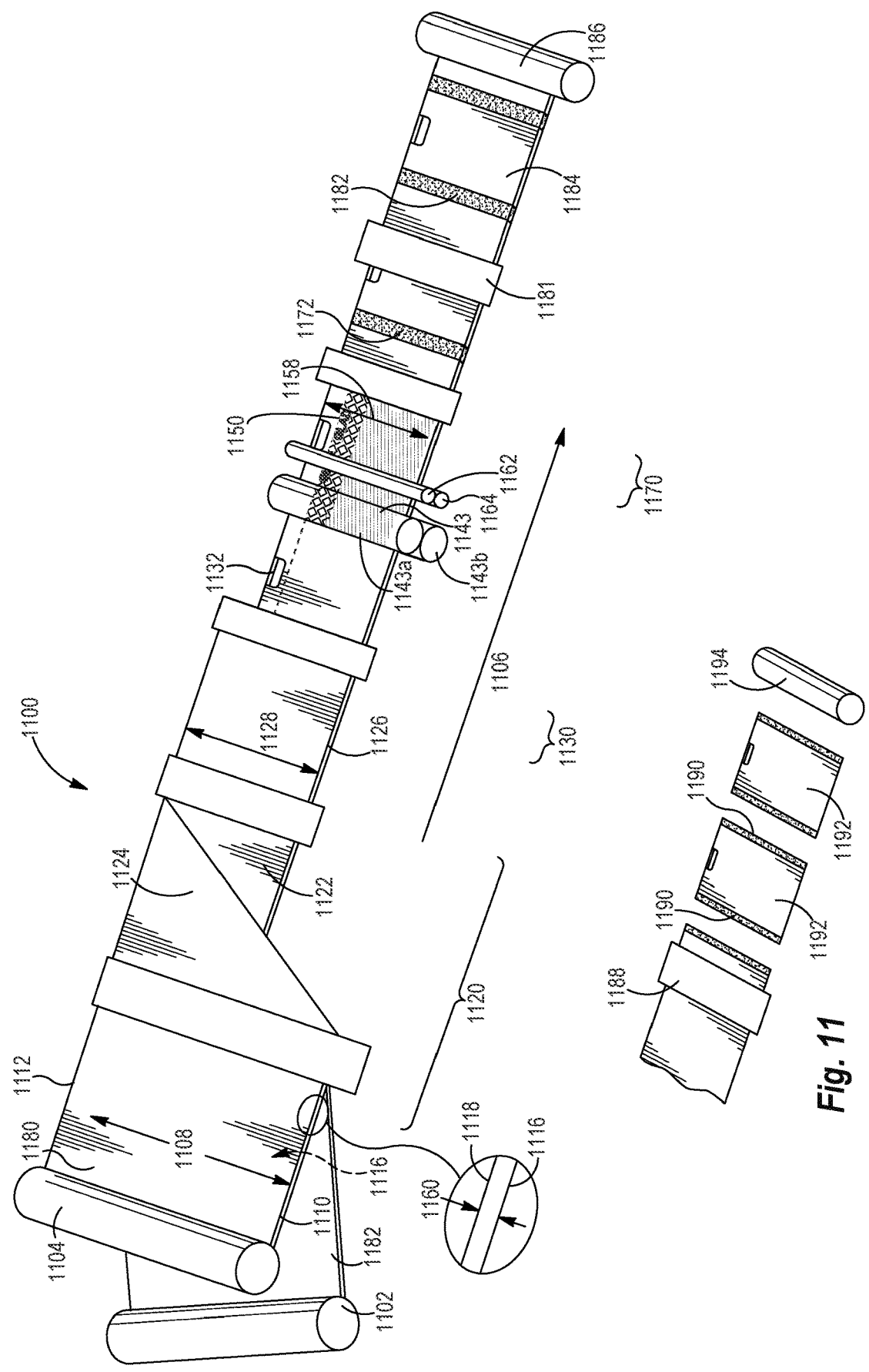
FIG. 11 illustrates a schematic diagram of a process of manufacturing a thermoplastic bag with contact areas arranged in text in accordance with one or more implementations of the present disclosure.

To produce a bag having one or more contact areas arranged into text as described, continuous webs of thermoplastic material may be processed through a high-speed manufacturing environment such as that illustrated in FIG. 11. In the illustrated process 1100, production may begin by unwinding a first continuous web or film 1180 of thermoplastic sheet material from a roll 1104 and advancing the web along a machine direction 1106. The unwound web 1180 may have a width 1108 that may be perpendicular to the machine direction 1106, as measured between a first edge 1110 and an opposite second edge 1112. The unwound web 1180 may have an initial average thickness 1160 measured between a first surface 1116 and a second surface 1118. In other manufacturing environments, the web 1180 may be provided in other forms or even extruded directly from a thermoplastic forming process.

In some implementations, the illustrated process 1100 involves unwinding a second continuous web or film 1182 of thermoplastic sheet material from a roll 1102 and advancing the web along a machine direction 1106. The second film 1182 can comprise a thermoplastic material, a width, and/or a thickness that is similar or the same as the first film 1180. In alternative one or more implementations, one or more of the thermoplastic material, width, and/or thickness of the second film 1182 can differ from that of the first film 1180. To provide the first and second sidewalls of the finished bag, the films 1180, 1182 may be folded into a first half 1122 and an opposing second half 1124 about the machine direction 1106 by a folding operation 1120. When so folded, the first edge 1110 may be moved adjacent to the second edge 1112 of the web. Accordingly, the width of the films 1180, 1182 proceeding in the machine direction 1106 after the folding operation 1120 may be a width 1128 that may be half the initial width 1108. As may be appreciated, the portion mid-width of the unwound films 1180, 1182 may become the outer edge of the folded films 1180, 1182. In any event, a hem channel may be formed by folding adjacent first and second edges 1110, 1112 over (e.g., at a top edge) and a draw tape 1132 may be inserted into the hem channel during a hem channel and draw tape operation 1130. In some implementations, as shown in FIG. 11, the hem channel and draw tape operation 1130 may fold over a length of the first and second edges 1110, 1112 such that a hem skirt is formed (e.g., indicated by the dashed line following the operation 1130) down an inner surface of the multi-film thermoplastic bag.

To form one or more regions of contact areas arranged into text in a multi-film thermoplastic bag, the processing equipment may include at least one set of contact rollers 1143 where at least one of the rolls is heated, such as those described herein above. Referring to FIG. 11, the folded web 1180 may be advanced along the machine direction 1106 between intermeshing rollers 1143*a*, which impart contact areas 1150 arranged into text in one portion, zone, area, or section of the resulting multi-film thermoplastic bag.

The folded web 1180 may then advance through the contact rollers 1143*b*, which impart the contact areas 1150 to the resulting multi-film thermoplastic bag. In one or more implementations, passing the folded web 1180 between the set of heated contact rollers 1143*b* creates one or more contact areas between flat portions of the folded web 1180 and the hem skirt (e.g., indicated by the dashed line). For example, the one or more contact areas can extend from the hem channel over the hem skirt toward the bottom edge of the folded web 1180.

As mentioned above, in one or more implementations, one of the contact rollers 1143b is heated (e.g., a metal contact roller) while other contact roller is unheated (e.g., a rubber contact roller). In such implementations, having heat being applied to the one side of the films 1180, 1182 can cause the contact areas on that heated side be more visually distinct (e.g., darker) and/or have more blocking between the layers on the headed side. Additionally, or alternatively, both of the rollers 1143a, 1143b may be heated rollers. For example, each of the rollers 1143a, 1143b may include a rubber roller (e.g., as a top or bottom roller) and a patterned roller.

In at least one embodiment, the processing equipment may include a vision system or sensor system in connection with one or more of the intermeshing rollers 1143a and the contact rollers 1143b. For example, the vision system or sensor system may detect pattern presence, placements, and darkness. Similarly, the sensor system may detect the TD placement of the film (e.g., similar to web breakout or guiding systems). Additionally, the processing equipment may include a force gauge probe to measure the drag of the film across the gauge between inner layers.

To avert imparting a pattern (e.g., of contact areas or otherwise) onto the portion of the web that includes the draw tape 1132, the corresponding ends of the rollers 1143a, 1143b may be smooth and without ridges, grooves, punch elements, or die elements. Thus, the adjacent edges 1110, 1112 and the corresponding portion of the web proximate those edges that pass between the smooth ends of the rollers 1143a, 1143b may not be imparted with any pattern. In alternative implementations, the intermeshing rollers (if present) and the contact rollers are positioned prior to the drawtape insertion process.

The processing equipment may include pinch rollers 1162, 1164 to accommodate the width 1158 of the web 1180. In one or more implementations, the nip rollers can be modified into contact rollers to produce contact areas. For example, in implementations with continuous contact areas, at least one of the pinch rollers 1162, 1164 can be heated and act as contact rollers.

In one more implementations, the heat and pressure of the contact rollers can ensure that there is little to no bonding between the folded halves 1122, 1124 to ensure that the bag 1184 can be opened.

To produce the finished bag, the processing equipment may further process the folded web with at least one region of contact areas. For example, to form the parallel side edges of the finished multi-film thermoplastic bag, the web may proceed through a sealing operation 1170 in which heat seals 1172 may be formed between the folded edge 1126 and the adjacent edges 1110, 1112. The heat seals may fuse together the adjacent halves 1122, 1124 of the folded web. The heat seals 1172 may be spaced apart along the folded web and in conjunction with the folded outer edge 1126 may define individual bags. The heat seals may be made with a heating device, such as, a heated knife. A perforating operation 1181 may perforate the heat seals 1172 with a perforating device, such as, a perforating knife so that individual bags 1192 may be separated from the web. In one or more implementations, the webs may be folded one or more times before the folded webs may be directed through the perforating operation. The web 1180 embodying the bags 1184 may be wound into a roll 1186 for packaging and distribution. For example, the roll 1186 may be placed in a box or a bag for sale to a customer.

In one or more implementations of the process, a cutting operation 1188 may replace the perforating operation 1180.

The web is directed through a cutting operation 1188 which cuts the webs at location 1190 into individual bags 1192 prior to winding onto a roll 1194 for packaging and distribution. For example, the roll 1194 may be placed in a box or bag for sale to a customer. The bags may be interleaved prior to winding into the roll 1194. In one or more implementations, the web may be folded one or more times before the folded web is cut into individual bags 1192. In one or more implementations, the bags 1192 may be positioned in a box or bag, and not onto the roll 1194.

The present disclosure may be embodied in other specific forms without departing from its spirit or essential characteristics. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-film thermoplastic bag comprising:
a first thermoplastic film having a first appearance;
a second thermoplastic film having a second appearance created by a pigment, the first appearance differing from the second appearance;
one or more separated portions where the first thermoplastic film and the second thermoplastic film are not in intimate contact, wherein the one or more separated portions are substantially flat; and
one or more contact areas arranged to create text, wherein the one or more contact areas comprise:
portions of the multi-film thermoplastic bag where the first thermoplastic film and the second thermoplastic film are in intimate contact; and
a contrast relative to separated portions surrounding the one or more contact areas, which when viewed in the first thermoplastic film makes the text legible, wherein the contrast is due to a difference in Delta E between the one or more contact areas arranged to create text and the separated portions surrounding the one or more contact areas.

2. The multi-film thermoplastic bag as recited in claim 1, wherein the one or more contact areas comprise the second appearance.

3. The multi-film thermoplastic bag as recited in claim 2, wherein the one or more separated portions have a third appearance differing from the first appearance and the second appearance.

4. The multi-film thermoplastic bag as recited in claim 3, wherein:
the first appearance is a first color due to a first pigment in the first thermoplastic film;
the second appearance is a second color due to the pigment in the second thermoplastic film;
the third appearance is a third color; and
the multi-film thermoplastic bag is devoid of a pigment of the third color.

5. The multi-film thermoplastic bag as recited in claim 1, wherein the one or more contact areas form bonds between the first thermoplastic film and the second thermoplastic film.

6. The multi-film thermoplastic bag as recited in claim 5, wherein the bonds of the one or more contact areas are configured to separate before either of the first thermoplastic film or the second thermoplastic film fails when subjected to peel forces.

7. The multi-film thermoplastic bag as recited in claim 5, wherein the bonds of the one or more contact areas are not configured to separate before either of the first thermoplastic film or the second thermoplastic film fails when subjected to peel forces.

8. The multi-film thermoplastic bag as recited in claim 1, wherein the text comprises a suffocation warning.

9. The multi-film thermoplastic bag as recited in claim 1, wherein the one or more contact areas are arranged in shapes of alphanumeric characters to create the text.

10. The multi-film thermoplastic bag as recited in claim 1, wherein the one or more contact areas secure a hem channel to a sidewall of the multi-film thermoplastic bag.

11. The multi-film thermoplastic bag as recited in claim 10, wherein the multi-film thermoplastic bag is devoid of a hem seal in a form of a continuous heat seal.

12. A thermoplastic bag comprising:

a first thermoplastic film sidewall and a second thermoplastic film sidewall joined together along a first side edge, an opposite second side edge, and a closed bottom edge, wherein the first thermoplastic film sidewall and the second thermoplastic film sidewall comprise a first color;

a layer of thermoplastic material adjacent to at least a portion of the first thermoplastic film sidewall, wherein the layer of thermoplastic material comprises a second color;

one or more separated portions where the first thermoplastic film sidewall and the layer of thermoplastic material are separated by a gap, wherein the one or more separated portions are substantially flat; and one or more contact areas arranged to create text, wherein the one or more contact areas comprise:

portions in which the first thermoplastic film sidewall and the layer of thermoplastic material are bonded together; and differ in appearance from separated portions surrounding the one or more contact areas making the text legible when viewed in the first thermoplastic film sidewall due to a difference in Delta E between the one or more contact areas arranged to create text and the one or more separated portions.

13. The thermoplastic bag as recited in claim 12, wherein the layer of thermoplastic material comprises a strip of thermoplastic material bonded to the first thermoplastic film sidewall by the one or more contact areas.

14. The thermoplastic bag as recited in claim 12, wherein the layer of thermoplastic material comprises a third sidewall of an inner thermoplastic bag positioned within the thermoplastic bag, the inner thermoplastic bag further comprising a fourth sidewall joined to the third sidewall along a side edge, an opposing side edge, and a second bottom.

15. The thermoplastic bag as recited in claim 14, further comprising heat seals securing the thermoplastic bag to the inner thermoplastic bag, wherein the heat seals in the thermoplastic bag have the second color and are not configured to separate before either of the thermoplastic bag or the inner thermoplastic bag fails when subjected to peel forces.

16. The thermoplastic bag as recited in claim 12, wherein the one or more contact areas extend across a width of the thermoplastic bag from the first side edge toward the opposite second side edge.

17. The thermoplastic bag as recited in claim 12, wherein:

the first color comprises a light color;

the second color comprises a dark color; and the one or more contact areas when viewed in the layer of thermoplastic material have an appearance similar to the separated portions surrounding the one or more contact areas making text less legible than when viewed in the first thermoplastic film sidewall.

18. The thermoplastic bag as recited in claim 12, wherein the one or more contact areas are arranged in shapes of alphanumeric characters to create the text.

19. The thermoplastic bag as recited in claim 12, wherein the one or more contact areas secure a hem channel to a sidewall of the multi-film thermoplastic bag.

20. The thermoplastic bag as recited in claim 12, wherein the thermoplastic bag is devoid of a hem seal in a form of a continuous heat seal.

* * * * *